(12) United States Patent
Simpson et al.

(10) Patent No.: US 10,099,283 B2
(45) Date of Patent: Oct. 16, 2018

(54) METHOD AND ASSEMBLY FOR FORMING COMPONENTS HAVING AN INTERNAL PASSAGE DEFINED THEREIN

(71) Applicant: General Electric Company, Schenectady, NY (US)

(72) Inventors: Stanley Frank Simpson, Simpsonville, SC (US); Stephen Francis Rutkowski, Duanesburg, NY (US); Canan Uslu Hardwicke, Simpsonville, SC (US); Joseph Leonard Moroso, Greenville, SC (US); Steven Charles Rauch, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 229 days.

(21) Appl. No.: 14/973,555

(22) Filed: Dec. 17, 2015

(65) Prior Publication Data
US 2017/0173683 A1 Jun. 22, 2017

(51) Int. Cl.
*B22D 19/00* (2006.01)
*B22D 25/02* (2006.01)
(Continued)

(52) U.S. Cl.
CPC ............... *B22D 25/02* (2013.01); *B22C 9/02* (2013.01); *B22C 9/04* (2013.01); *B22C 9/10* (2013.01); *B22C 9/108* (2013.01); *B22C 9/24* (2013.01); *B22C 21/14* (2013.01); *B22D 19/0072* (2013.01); *B22D 19/08* (2013.01); *B22F 3/1055* (2013.01); *B22F 3/20* (2013.01);
(Continued)

(58) Field of Classification Search
CPC .. B22C 9/06; B22C 9/10; B22C 9/106; B22C 9/108; B22C 9/24; B22D 19/00; B22D 19/0054; B22D 19/0072; B22D 19/08; B22D 25/02; B22D 29/00; B22D 29/001
USPC ............ 164/24, 91, 132, 365, 366, 367, 369
See application file for complete search history.

(56) References Cited

U.S. PATENT DOCUMENTS 2,687,278 A 8/1954 Smith et al.
2,756,475 A 7/1956 Hanink et al.
(Continued)

FOREIGN PATENT DOCUMENTS

CH 640440 A5 1/1984
EP 0025481 A1 3/1981
(Continued)

OTHER PUBLICATIONS

European Search Report and Opinion issued in connection with related EP Application No. 16202422.8 dated May 8, 2017.
(Continued)

*Primary Examiner* — Kevin P Kerns
(74) *Attorney, Agent, or Firm* — Armstrong Teasdale LLP

(57) ABSTRACT

A method of forming a component having an internal passage defined therein includes positioning a jacketed core with respect to a mold. The jacketed core includes a hollow structure formed from at least a first material and a second material, and an inner core disposed within the hollow structure. The method also includes introducing a component material in a molten state into a cavity of the mold, and cooling the component material in the cavity to form the component. The inner core defines the internal passage within the component.

21 Claims, 11 Drawing Sheets

(51) Int. Cl.

| | | |
|---|---|---|
| *B22C 9/10* | (2006.01) | |
| *B22C 9/24* | (2006.01) | |
| *B33Y 10/00* | (2015.01) | |
| *B33Y 80/00* | (2015.01) | |
| *B23K 26/342* | (2014.01) | |
| *B22C 9/02* | (2006.01) | |
| *B22F 3/105* | (2006.01) | |
| *B22F 3/20* | (2006.01) | |
| *B22F 5/00* | (2006.01) | |
| *B23K 15/00* | (2006.01) | |
| *B22C 9/04* | (2006.01) | |
| *B22C 21/14* | (2006.01) | |
| *B22D 19/08* | (2006.01) | |
| *F01D 5/18* | (2006.01) | |
| *F01D 9/02* | (2006.01) | |
| *F01D 25/12* | (2006.01) | |
| *F04D 29/32* | (2006.01) | |
| *F04D 29/54* | (2006.01) | |
| *F04D 29/58* | (2006.01) | |

(52) U.S. Cl.
CPC .......... *B22F 5/007* (2013.01); *B23K 15/0086* (2013.01); *B23K 26/342* (2015.10); *B33Y 10/00* (2014.12); *B33Y 80/00* (2014.12); *F01D 5/18* (2013.01); *F01D 9/02* (2013.01); *F01D 25/12* (2013.01); *F04D 29/324* (2013.01); *F04D 29/542* (2013.01); *F04D 29/582* (2013.01); *F05D 2220/32* (2013.01); *F05D 2230/211* (2013.01)

(56) References Cited

U.S. PATENT DOCUMENTS

| | | | |
|---|---|---|---|
| 2,991,520 | A | 7/1961 | Dalton |
| 3,160,931 | A | 12/1964 | Leach |
| 3,222,435 | A | 12/1965 | Mellen, Jr. et al. |
| 3,222,737 | A | 12/1965 | Reuter |
| 3,475,375 | A | 10/1969 | Yates |
| 3,563,711 | A | 2/1971 | Hammond et al. |
| 3,596,703 | A | 8/1971 | Bishop et al. |
| 3,597,248 | A | 8/1971 | Yates |
| 3,662,816 | A | 5/1972 | Bishop et al. |
| 3,678,987 | A | 7/1972 | Kydd |
| 3,689,986 | A | 9/1972 | Takahashi et al. |
| 3,694,264 | A | 9/1972 | Weinland et al. |
| 3,773,506 | A | 11/1973 | Larker et al. |
| 3,824,113 | A | 7/1974 | Loxley et al. |
| 3,844,727 | A | 10/1974 | Copley et al. |
| 3,863,701 | A | 2/1975 | Niimi et al. |
| 3,866,448 | A | 2/1975 | Dennis et al. |
| 3,921,271 | A | 11/1975 | Dennis et al. |
| 3,996,048 | A | 12/1976 | Fiedler |
| 4,096,296 | A | 6/1978 | Galmiche et al. |
| 4,130,157 | A | 12/1978 | Miller et al. |
| 4,148,352 | A | 4/1979 | Sensui et al. |
| 4,236,568 | A | 12/1980 | Larson |
| 4,285,634 | A | 8/1981 | Rossman et al. |
| 4,352,390 | A | 10/1982 | Larson |
| 4,372,404 | A | 2/1983 | Drake |
| 4,375,233 | A | 3/1983 | Rossmann et al. |
| 4,417,381 | A | 11/1983 | Higginbotham |
| 4,432,798 | A | 2/1984 | Helferich et al. |
| 4,557,691 | A | 12/1985 | Martin et al. |
| 4,576,219 | A | 3/1986 | Uram |
| 4,583,581 | A | 4/1986 | Ferguson et al. |
| 4,604,780 | A | 8/1986 | Metcalfe |
| 4,637,449 | A | 1/1987 | Mills et al. |
| 4,738,587 | A | 4/1988 | Kildea |
| 4,859,141 | A | 8/1989 | Maisch et al. |
| 4,905,750 | A | 3/1990 | Wolf |
| 4,911,990 | A | 3/1990 | Prewo et al. |
| 4,964,148 | A | 10/1990 | Klostermann et al. |
| 4,986,333 | A | 1/1991 | Gartland |
| 5,052,463 | A | 10/1991 | Lechner et al. |
| 5,083,371 | A | 1/1992 | Leibfried et al. |
| 5,243,759 | A | 9/1993 | Brown et al. |
| 5,248,869 | A | 9/1993 | DeBell et al. |
| 5,273,104 | A | 12/1993 | Renaud et al. |
| 5,291,654 | A | 3/1994 | Judd et al. |
| 5,295,530 | A | 3/1994 | O'Connor et al. |
| 5,332,023 | A | 7/1994 | Mills |
| 5,350,002 | A | 9/1994 | Orton |
| 5,355,668 | A | 10/1994 | Weil et al. |
| 5,371,945 | A | 12/1994 | Schnoor |
| 5,387,280 | A | 2/1995 | Kennerknecht |
| 5,394,932 | A | 3/1995 | Carozza et al. |
| 5,398,746 | A | 3/1995 | Igarashi |
| 5,413,463 | A | 5/1995 | Chin et al. |
| 5,465,780 | A | 11/1995 | Muntner et al. |
| 5,467,528 | A | 11/1995 | Bales et al. |
| 5,468,285 | A | 11/1995 | Kennerknecht |
| 5,482,054 | A | 1/1996 | Slater et al. |
| 5,498,132 | A | 3/1996 | Carozza et al. |
| 5,505,250 | A | 4/1996 | Jago |
| 5,507,336 | A | 4/1996 | Tobin |
| 5,509,659 | A | 4/1996 | Igarashi |
| 5,524,695 | A | 6/1996 | Schwartz |
| 5,569,320 | A | 10/1996 | Sasaki et al. |
| 5,611,848 | A | 3/1997 | Sasaki et al. |
| 5,664,628 | A | 9/1997 | Koehler et al. |
| 5,679,270 | A | 10/1997 | Thornton et al. |
| 5,738,493 | A | 4/1998 | Lee et al. |
| 5,778,963 | A | 7/1998 | Parille et al. |
| 5,810,552 | A | 9/1998 | Frasier |
| 5,820,774 | A | 10/1998 | Dietrich |
| 5,909,773 | A | 6/1999 | Koehler et al. |
| 5,924,483 | A | 7/1999 | Frasier |
| 5,927,373 | A | 7/1999 | Tobin |
| 5,947,181 | A | 9/1999 | Davis |
| 5,951,256 | A | 9/1999 | Dietrich |
| 5,976,457 | A | 11/1999 | Amaya et al. |
| 6,029,736 | A | 2/2000 | Naik et al. |
| 6,039,763 | A | 3/2000 | Shelokov |
| 6,041,679 | A | 3/2000 | Slater et al. |
| 6,068,806 | A | 5/2000 | Dietrich |
| 6,186,741 | B1 | 2/2001 | Webb et al. |
| 6,221,289 | B1 | 4/2001 | Corbett et al. |
| 6,234,753 | B1 | 5/2001 | Lee |
| 6,244,327 | B1 | 6/2001 | Frasier |
| 6,251,526 | B1 | 6/2001 | Staub |
| 6,327,943 | B1 | 12/2001 | Wrigley et al. |
| 6,359,254 | B1 | 3/2002 | Brown |
| 6,441,341 | B1 | 8/2002 | Steibel et al. |
| 6,467,534 | B1 | 10/2002 | Klug et al. |
| 6,474,348 | B1 | 11/2002 | Beggs et al. |
| 6,505,678 | B2 | 1/2003 | Mertins |
| 6,557,621 | B1 | 5/2003 | Dierksmeier et al. |
| 6,578,623 | B2 | 6/2003 | Keller et al. |
| 6,605,293 | B1 | 8/2003 | Giordano et al. |
| 6,615,470 | B2 | 9/2003 | Corderman et al. |
| 6,623,521 | B2 | 9/2003 | Steinke et al. |
| 6,626,230 | B1 | 9/2003 | Woodrum et al. |
| 6,634,858 | B2 | 10/2003 | Roeloffs et al. |
| 6,637,500 | B2 | 10/2003 | Shah et al. |
| 6,644,921 | B2 | 11/2003 | Bunker et al. |
| 6,670,026 | B2 | 12/2003 | Steibel et al. |
| 6,694,731 | B2 | 2/2004 | Kamen et al. |
| 6,773,231 | B2 | 8/2004 | Bunker et al. |
| 6,799,627 | B2 | 10/2004 | Ray et al. |
| 6,800,234 | B2 | 10/2004 | Ferguson et al. |
| 6,817,379 | B2 | 11/2004 | Perla |
| 6,837,417 | B2 | 1/2005 | Srinivasan |
| 6,896,036 | B2 | 5/2005 | Schneiders et al. |
| 6,913,064 | B2 | 7/2005 | Beals et al. |
| 6,929,054 | B2 | 8/2005 | Beals et al. |
| 6,955,522 | B2 | 10/2005 | Cunha et al. |
| 6,986,381 | B2 | 1/2006 | Ray et al. |
| 7,028,747 | B2 | 4/2006 | Widrig et al. |
| 7,036,556 | B2 | 5/2006 | Caputo et al. |
| 7,052,710 | B2 | 5/2006 | Giordano et al. |
| 7,073,561 | B1 | 7/2006 | Henn |

(56) References Cited

U.S. PATENT DOCUMENTS

| | | |
|---|---|---|
| 7,093,645 B2 | 8/2006 | Grunstra et al. |
| 7,108,045 B2 | 9/2006 | Wiedemer et al. |
| 7,109,822 B2 | 9/2006 | Perkins et al. |
| 7,174,945 B2 | 2/2007 | Beals et al. |
| 7,185,695 B1 | 3/2007 | Santeler |
| 7,207,375 B2 | 4/2007 | Turkington et al. |
| 7,234,506 B2 | 6/2007 | Grunstra et al. |
| 7,237,375 B2 | 7/2007 | Humcke et al. |
| 7,237,595 B2 | 7/2007 | Beck et al. |
| 7,240,718 B2 | 7/2007 | Schmidt et al. |
| 7,243,700 B2 | 7/2007 | Beals et al. |
| 7,246,652 B2 | 7/2007 | Fowler |
| 7,270,170 B2 | 9/2007 | Beals et al. |
| 7,270,173 B2 | 9/2007 | Wiedemer et al. |
| 7,278,460 B2 | 10/2007 | Grunstra et al. |
| 7,278,463 B2 | 10/2007 | Snyder et al. |
| 7,306,026 B2 | 12/2007 | Memmen |
| 7,322,795 B2 | 1/2008 | Luczak et al. |
| 7,325,587 B2 | 2/2008 | Memmen |
| 7,334,625 B2 | 2/2008 | Judge et al. |
| 7,343,730 B2 | 3/2008 | Humcke et al. |
| 7,371,043 B2 | 5/2008 | Keller |
| 7,371,049 B2 | 5/2008 | Cunha et al. |
| 7,377,746 B2 | 5/2008 | Brassfield et al. |
| 7,410,342 B2 | 8/2008 | Matheny |
| 7,438,118 B2 | 10/2008 | Santeler |
| 7,448,433 B2 | 11/2008 | Ortiz et al. |
| 7,448,434 B2 | 11/2008 | Turkington et al. |
| 7,461,684 B2 | 12/2008 | Liu et al. |
| 7,478,994 B2 | 1/2009 | Cunha et al. |
| 7,517,225 B2 | 4/2009 | Cherian |
| 7,575,039 B2 | 8/2009 | Beals et al. |
| 7,588,069 B2 | 9/2009 | Munz et al. |
| 7,624,787 B2 | 12/2009 | Lee et al. |
| 7,625,172 B2 | 12/2009 | Walz et al. |
| 7,673,669 B2 | 3/2010 | Snyder et al. |
| 7,686,065 B2 | 3/2010 | Luczak |
| 7,713,029 B1 | 5/2010 | Davies |
| 7,717,676 B2 | 5/2010 | Cunha et al. |
| 7,722,327 B1 | 5/2010 | Liang |
| 7,802,613 B2 | 5/2010 | Bullied et al. |
| 7,727,495 B2 | 6/2010 | Burd et al. |
| 7,731,481 B2 | 6/2010 | Cunha et al. |
| 7,753,104 B2 | 7/2010 | Luczak et al. |
| 7,757,745 B2 | 7/2010 | Luczak |
| 7,771,210 B2 | 8/2010 | Cherian |
| 7,779,892 B2 | 8/2010 | Luczak et al. |
| 7,789,626 B1 | 9/2010 | Liang |
| 7,798,201 B2 | 9/2010 | Bewlay et al. |
| 7,806,681 B2 | 10/2010 | Fieck et al. |
| 7,861,766 B2 | 1/2011 | Bochiechio et al. |
| 7,882,884 B2 | 2/2011 | Beals et al. |
| 7,938,168 B2 | 5/2011 | Lee et al. |
| 7,947,233 B2 | 5/2011 | Burd et al. |
| 7,963,085 B2 | 6/2011 | Sypeck et al. |
| 7,993,106 B2 | 8/2011 | Walters |
| 8,057,183 B1 | 11/2011 | Liang |
| 8,066,483 B1 | 11/2011 | Liang |
| 8,100,165 B2 | 1/2012 | Piggush et al. |
| 8,113,780 B2 | 2/2012 | Cherolis et al. |
| 8,122,583 B2 | 2/2012 | Luczak et al. |
| 8,137,068 B2 | 3/2012 | Surace et al. |
| 8,162,609 B1 | 4/2012 | Liang |
| 8,167,537 B1 | 5/2012 | Plank et al. |
| 8,171,978 B2 | 5/2012 | Propheter-Hinckley et al. |
| 8,181,692 B2 | 5/2012 | Frasier et al. |
| 8,196,640 B1 | 6/2012 | Paulus et al. |
| 8,251,123 B2 | 8/2012 | Farris et al. |
| 8,251,660 B1 | 8/2012 | Liang |
| 8,261,810 B1 | 9/2012 | Liang |
| 8,291,963 B1 | 10/2012 | Trinks et al. |
| 8,297,455 B2 | 10/2012 | Smyth |
| 8,302,668 B1 | 11/2012 | Bullied et al. |
| 8,303,253 B1 | 11/2012 | Liang |
| 8,307,654 B1 | 11/2012 | Liang |
| 8,317,475 B1 | 11/2012 | Downs |
| 8,322,988 B1 | 12/2012 | Downs et al. |
| 8,336,606 B2 | 12/2012 | Piggush |
| 8,342,802 B1 | 1/2013 | Liang |
| 8,366,394 B1 | 2/2013 | Liang |
| 8,381,923 B2 | 2/2013 | Smyth |
| 8,414,263 B1 | 4/2013 | Liang |
| 8,500,401 B1 | 8/2013 | Liang |
| 8,506,256 B1 | 8/2013 | Brostmeyer et al. |
| 8,535,004 B2 | 9/2013 | Campbell |
| 8,622,113 B1 | 1/2014 | Rau, III |
| 8,678,766 B1 | 3/2014 | Liang |
| 8,734,108 B1 | 5/2014 | Liang |
| 8,753,083 B2 | 6/2014 | Lacy et al. |
| 8,770,931 B2 | 7/2014 | Alvanos et al. |
| 8,777,571 B1 | 7/2014 | Liang |
| 8,793,871 B2 | 8/2014 | Morrison et al. |
| 8,794,298 B2 | 8/2014 | Schlienger et al. |
| 8,807,943 B1 | 8/2014 | Liang |
| 8,813,812 B2 | 8/2014 | Ellgass et al. |
| 8,813,824 B2 | 8/2014 | Appleby et al. |
| 8,858,176 B1 | 10/2014 | Liang |
| 8,864,469 B1 | 10/2014 | Liang |
| 8,870,524 B1 | 10/2014 | Liang |
| 8,876,475 B1 | 11/2014 | Liang |
| 8,893,767 B2 | 11/2014 | Mueller et al. |
| 8,899,303 B2 | 12/2014 | Mueller et al. |
| 8,906,170 B2 | 12/2014 | Gigliotti, Jr. et al. |
| 8,911,208 B2 | 12/2014 | Propheter-Hinckley et al. |
| 8,915,289 B2 | 12/2014 | Mueller et al. |
| 8,936,068 B2 | 1/2015 | Lee et al. |
| 8,940,114 B2 | 1/2015 | James et al. |
| 8,969,760 B2 | 3/2015 | Hu et al. |
| 8,978,385 B2 | 3/2015 | Cunha |
| 8,993,923 B2 | 3/2015 | Hu et al. |
| 8,997,836 B2 | 4/2015 | Mueller et al. |
| 9,038,706 B2 | 5/2015 | Hillier |
| 9,051,838 B2 | 6/2015 | Wardle et al. |
| 9,057,277 B2 | 6/2015 | Appleby et al. |
| 9,057,523 B2 | 6/2015 | Cunha et al. |
| 9,061,350 B2 | 6/2015 | Bewlay et al. |
| 9,079,241 B2 | 7/2015 | Barber et al. |
| 9,079,803 B2 | 7/2015 | Xu |
| 9,174,271 B2 | 11/2015 | Newton et al. |
| 9,579,714 B1 | 2/2017 | Rutkowski |
| 2001/0044651 A1 | 11/2001 | Steinke et al. |
| 2002/0029567 A1 | 3/2002 | Kamen et al. |
| 2002/0182056 A1 | 12/2002 | Widrig et al. |
| 2002/0187065 A1 | 12/2002 | Amaya et al. |
| 2002/0190039 A1 | 12/2002 | Steibel et al. |
| 2002/0197161 A1 | 12/2002 | Roeloffs et al. |
| 2003/0047197 A1 | 3/2003 | Beggs et al. |
| 2003/0062088 A1 | 4/2003 | Perla |
| 2003/0133799 A1 | 7/2003 | Widrig et al. |
| 2003/0150092 A1 | 8/2003 | Corderman et al. |
| 2003/0199969 A1 | 10/2003 | Steinke et al. |
| 2003/0201087 A1 | 10/2003 | Devine et al. |
| 2004/0024470 A1 | 2/2004 | Giordano et al. |
| 2004/0055725 A1 | 3/2004 | Ray et al. |
| 2004/0056079 A1 | 3/2004 | Srinivasan |
| 2004/0144089 A1 | 7/2004 | Kamen et al. |
| 2004/0154252 A1 | 8/2004 | Sypeck et al. |
| 2004/0159985 A1 | 8/2004 | Altoonian et al. |
| 2005/0006047 A1 | 1/2005 | Wang et al. |
| 2005/0016706 A1 | 1/2005 | Ray et al. |
| 2005/0087319 A1 | 4/2005 | Beals et al. |
| 2005/0133193 A1 | 6/2005 | Beals et al. |
| 2005/0247429 A1 | 11/2005 | Turkington et al. |
| 2006/0032604 A1 | 2/2006 | Beck et al. |
| 2006/0048553 A1 | 3/2006 | Almquist |
| 2006/0065383 A1 | 3/2006 | Ortiz et al. |
| 2006/0107668 A1 | 5/2006 | Cunha et al. |
| 2006/0118262 A1 | 6/2006 | Beals et al. |
| 2006/0118990 A1 | 6/2006 | Dierkes et al. |
| 2006/0237163 A1 | 10/2006 | Turkington et al. |
| 2006/0283168 A1 | 12/2006 | Humcke et al. |
| 2007/0044936 A1 | 3/2007 | Memmen |
| 2007/0059171 A1 | 3/2007 | Simms et al. |
| 2007/0107412 A1 | 5/2007 | Humcke et al. |

(56) References Cited

U.S. PATENT DOCUMENTS

| | | |
|---|---|---|
| 2007/0114001 A1 | 5/2007 | Snyder et al. |
| 2007/0116972 A1 | 5/2007 | Persky |
| 2007/0169605 A1 | 7/2007 | Szymanski |
| 2007/0177975 A1 | 8/2007 | Luczak et al. |
| 2007/0253816 A1 | 11/2007 | Walz et al. |
| 2008/0003849 A1 | 1/2008 | Cherian |
| 2008/0080979 A1 | 4/2008 | Brassfield et al. |
| 2008/0131285 A1 | 6/2008 | Albert et al. |
| 2008/0135718 A1 | 6/2008 | Lee et al. |
| 2008/0138208 A1 | 6/2008 | Walters |
| 2008/0138209 A1 | 6/2008 | Cunha et al. |
| 2008/0145235 A1 | 6/2008 | Cunha et al. |
| 2008/0169412 A1 | 7/2008 | Snyder et al. |
| 2008/0190582 A1 | 8/2008 | Lee et al. |
| 2009/0041587 A1 | 2/2009 | Konter et al. |
| 2009/0095435 A1 | 4/2009 | Luczak et al. |
| 2009/0181560 A1 | 7/2009 | Cherian |
| 2009/0255742 A1 | 10/2009 | Hansen |
| 2010/0021643 A1 | 1/2010 | Lane et al. |
| 2010/0150733 A1 | 6/2010 | Abdel-Messeh et al. |
| 2010/0200189 A1 | 8/2010 | Qi et al. |
| 2010/0219325 A1 | 9/2010 | Bullied et al. |
| 2010/0276103 A1 | 11/2010 | Bullied et al. |
| 2010/0304064 A1 | 12/2010 | Huttner |
| 2011/0048665 A1 | 3/2011 | Schlienger et al. |
| 2011/0068077 A1 | 3/2011 | Smyth |
| 2011/0132563 A1 | 6/2011 | Merrill et al. |
| 2011/0132564 A1 | 6/2011 | Merrill et al. |
| 2011/0135446 A1 | 6/2011 | Dube et al. |
| 2011/0146075 A1 | 6/2011 | Hazel et al. |
| 2011/0150666 A1 | 6/2011 | Hazel et al. |
| 2011/0189440 A1 | 8/2011 | Appleby et al. |
| 2011/0236221 A1 | 9/2011 | Campbell |
| 2011/0240245 A1 | 10/2011 | Schlienger et al. |
| 2011/0250078 A1 | 10/2011 | Bruce et al. |
| 2011/0250385 A1 | 10/2011 | Sypeck et al. |
| 2011/0293434 A1 | 12/2011 | Lee et al. |
| 2011/0315337 A1 | 12/2011 | Piggush |
| 2012/0161498 A1 | 6/2012 | Hansen |
| 2012/0163995 A1 | 6/2012 | Wardle et al. |
| 2012/0168108 A1 | 7/2012 | Farris et al. |
| 2012/0183412 A1 | 7/2012 | Lacy et al. |
| 2012/0186681 A1 | 7/2012 | Sun et al. |
| 2012/0186768 A1 | 7/2012 | Sun et al. |
| 2012/0193841 A1 | 8/2012 | Wang et al. |
| 2012/0237786 A1 | 9/2012 | Morrison et al. |
| 2012/0276361 A1 | 11/2012 | James et al. |
| 2012/0298321 A1 | 11/2012 | Smyth |
| 2013/0019604 A1 | 1/2013 | Cunha et al. |
| 2013/0025287 A1 | 1/2013 | Cunha |
| 2013/0025288 A1 | 1/2013 | Cunha et al. |
| 2013/0064676 A1 | 3/2013 | Salisbury et al. |
| 2013/0139990 A1 | 6/2013 | Appleby et al. |
| 2013/0177448 A1 | 7/2013 | Spangler |
| 2013/0220571 A1 | 8/2013 | Mueller et al. |
| 2013/0266816 A1 | 10/2013 | Xu |
| 2013/0280093 A1 | 10/2013 | Zelesky et al. |
| 2013/0318771 A1 | 12/2013 | Luczak et al. |
| 2013/0323033 A1 | 12/2013 | Lutjen et al. |
| 2013/0327602 A1 | 12/2013 | Barber et al. |
| 2013/0333855 A1 | 12/2013 | Merrill et al. |
| 2013/0338267 A1 | 12/2013 | Appleby et al. |
| 2014/0023497 A1 | 1/2014 | Giglio et al. |
| 2014/0031458 A1 | 1/2014 | Jansen |
| 2014/0033736 A1 | 2/2014 | Propheter-Hinckley et al. |
| 2014/0068939 A1 | 3/2014 | Devine, II et al. |
| 2014/0076857 A1 | 3/2014 | Hu et al. |
| 2014/0076868 A1 | 3/2014 | Hu et al. |
| 2014/0093387 A1 | 4/2014 | Pointon et al. |
| 2014/0140860 A1 | 5/2014 | Tibbott et al. |
| 2014/0169981 A1 | 6/2014 | Bales et al. |
| 2014/0199177 A1 | 7/2014 | Propheter-Hinckley et al. |
| 2014/0202650 A1 | 7/2014 | Song et al. |
| 2014/0284016 A1 | 9/2014 | Vander Wal |
| 2014/0311315 A1 | 10/2014 | Isaac |
| 2014/0314581 A1 | 10/2014 | McBrien et al. |
| 2014/0342175 A1 | 11/2014 | Morrison et al. |
| 2014/0342176 A1 | 11/2014 | Appleby et al. |
| 2014/0356560 A1 | 12/2014 | Prete et al. |
| 2014/0363305 A1 | 12/2014 | Shah et al. |
| 2015/0053365 A1 | 2/2015 | Mueller et al. |
| 2015/0174653 A1 | 6/2015 | Verner et al. |
| 2015/0184857 A1 | 7/2015 | Cunha et al. |
| 2015/0306657 A1 | 10/2015 | Frank |
| 2017/0173666 A1 | 6/2017 | Hardwicke et al. |
| 2017/0173667 A1 | 6/2017 | Arnett et al. |
| 2017/0173669 A1 | 6/2017 | Moricca et al. |
| 2017/0173674 A1 | 6/2017 | Arnett et al. |
| 2017/0173675 A1 | 6/2017 | Arnett et al. |
| 2017/0173680 A1 | 6/2017 | Rutkowski |
| 2017/0173681 A1 | 6/2017 | Moricca et al. |
| 2017/0173682 A1 | 6/2017 | Simpson |
| 2017/0173684 A1 | 6/2017 | Simpson et al. |
| 2017/0173685 A1 | 6/2017 | Kittleson |
| 2017/0312815 A1 | 11/2017 | Tallman et al. |
| 2017/0312816 A1 | 11/2017 | Tallman et al. |

FOREIGN PATENT DOCUMENTS

| | | |
|---|---|---|
| EP | 0025481 B1 | 2/1983 |
| EP | 0111600 A1 | 6/1984 |
| EP | 0190114 A1 | 8/1986 |
| EP | 0319244 A2 | 6/1989 |
| EP | 0324229 A2 | 7/1989 |
| EP | 0324229 B1 | 7/1992 |
| EP | 0539317 A1 | 4/1993 |
| EP | 0556946 A1 | 8/1993 |
| EP | 0559251 A1 | 9/1993 |
| EP | 0585183 A1 | 3/1994 |
| EP | 0319244 B1 | 5/1994 |
| EP | 0661246 A1 | 7/1995 |
| EP | 0539317 B1 | 11/1995 |
| EP | 0715913 A1 | 6/1996 |
| EP | 0725606 A1 | 8/1996 |
| EP | 0750956 A2 | 1/1997 |
| EP | 0750957 A1 | 1/1997 |
| EP | 0792409 A1 | 9/1997 |
| EP | 0691894 B1 | 10/1997 |
| EP | 0805729 A2 | 11/1997 |
| EP | 0818256 A1 | 1/1998 |
| EP | 0556946 B1 | 4/1998 |
| EP | 0559251 B1 | 12/1998 |
| EP | 0585183 B1 | 3/1999 |
| EP | 0899039 A2 | 3/1999 |
| EP | 0750956 B1 | 5/1999 |
| EP | 0661246 B1 | 9/1999 |
| EP | 0725606 B1 | 12/1999 |
| EP | 0968062 A1 | 1/2000 |
| EP | 0805729 B1 | 8/2000 |
| EP | 1055800 A2 | 11/2000 |
| EP | 1070829 A2 | 1/2001 |
| EP | 1124509 A1 | 8/2001 |
| EP | 1142658 A1 | 10/2001 |
| EP | 1161307 A1 | 12/2001 |
| EP | 1163970 A1 | 12/2001 |
| EP | 1178769 A1 | 2/2002 |
| EP | 0715913 B1 | 4/2002 |
| EP | 0968062 B1 | 5/2002 |
| EP | 0951579 B1 | 1/2003 |
| EP | 1284338 A2 | 2/2003 |
| EP | 0750957 B1 | 3/2003 |
| EP | 1341481 A2 | 9/2003 |
| EP | 1358958 A1 | 11/2003 |
| EP | 1367224 A1 | 12/2003 |
| EP | 0818256 B1 | 2/2004 |
| EP | 1124509 B1 | 3/2004 |
| EP | 1425483 A2 | 6/2004 |
| EP | 1055800 B1 | 10/2004 |
| EP | 1163970 B1 | 3/2005 |
| EP | 1358958 B1 | 3/2005 |
| EP | 1519116 A1 | 3/2005 |
| EP | 1531019 A1 | 5/2005 |
| EP | 0899039 B1 | 11/2005 |
| EP | 1604753 A1 | 12/2005 |

(56) References Cited

FOREIGN PATENT DOCUMENTS

| | | |
|---|---|---|
| EP | 1659264 A2 | 5/2006 |
| EP | 1178769 B1 | 7/2006 |
| EP | 1382403 B1 | 9/2006 |
| EP | 1759788 A2 | 3/2007 |
| EP | 1764171 A1 | 3/2007 |
| EP | 1813775 A2 | 8/2007 |
| EP | 1815923 A1 | 8/2007 |
| EP | 1849965 A2 | 10/2007 |
| EP | 1070829 B1 | 1/2008 |
| EP | 1142658 B1 | 3/2008 |
| EP | 1927414 A2 | 6/2008 |
| EP | 1930097 A1 | 6/2008 |
| EP | 1930098 A1 | 6/2008 |
| EP | 1930099 A1 | 6/2008 |
| EP | 1932604 A1 | 6/2008 |
| EP | 1936118 A2 | 6/2008 |
| EP | 1939400 A2 | 7/2008 |
| EP | 1984162 A1 | 10/2008 |
| EP | 1604753 B1 | 11/2008 |
| EP | 2000234 A2 | 12/2008 |
| EP | 2025869 A1 | 2/2009 |
| EP | 1531019 B1 | 3/2010 |
| EP | 2212040 A1 | 8/2010 |
| EP | 2246133 A1 | 11/2010 |
| EP | 2025869 B1 | 12/2010 |
| EP | 2335845 A1 | 6/2011 |
| EP | 2336493 A2 | 6/2011 |
| EP | 2336494 A2 | 6/2011 |
| EP | 1930097 B1 | 7/2011 |
| EP | 2362822 A2 | 9/2011 |
| EP | 2366476 A1 | 9/2011 |
| EP | 2392774 A1 | 12/2011 |
| EP | 1930098 B1 | 2/2012 |
| EP | 2445668 A2 | 5/2012 |
| EP | 2445669 A2 | 5/2012 |
| EP | 2461922 A1 | 6/2012 |
| EP | 1659264 B1 | 11/2012 |
| EP | 2519367 A2 | 11/2012 |
| EP | 2537606 A1 | 12/2012 |
| EP | 1927414 B1 | 1/2013 |
| EP | 2549186 A2 | 1/2013 |
| EP | 2551592 A2 | 1/2013 |
| EP | 2551593 A2 | 1/2013 |
| EP | 2559533 A2 | 2/2013 |
| EP | 2559534 A2 | 2/2013 |
| EP | 2559535 A2 | 2/2013 |
| EP | 2576099 A1 | 4/2013 |
| EP | 2000234 B1 | 7/2013 |
| EP | 2614902 A2 | 7/2013 |
| EP | 2650062 A2 | 10/2013 |
| EP | 2246133 B1 | 7/2014 |
| EP | 2366476 B1 | 7/2014 |
| EP | 2777841 A1 | 9/2014 |
| EP | 1849965 B1 | 2/2015 |
| EP | 2834031 A2 | 2/2015 |
| EP | 1341481 B1 | 3/2015 |
| EP | 2841710 A1 | 3/2015 |
| EP | 2855857 A2 | 4/2015 |
| EP | 2880276 A1 | 6/2015 |
| EP | 2937161 A1 | 10/2015 |
| GB | 731292 A | 6/1955 |
| GB | 800228 A | 8/1958 |
| GB | 2102317 A | 2/1983 |
| GB | 2118078 A | 10/1983 |
| JP | 5-330957 A | * 12/1993 ............... B22C 9/10 |
| JP | H1052731 A | 2/1998 |
| WO | 9615866 A1 | 5/1996 |
| WO | 9618022 A1 | 6/1996 |
| WO | 2010036801 A2 | 4/2010 |
| WO | 2010040746 A1 | 4/2010 |
| WO | 2010151833 A2 | 12/2010 |
| WO | 2010151838 A2 | 12/2010 |
| WO | 2011019667 A1 | 2/2011 |
| WO | 2013163020 A1 | 10/2013 |
| WO | 2014011262 A2 | 1/2014 |
| WO | 2014022255 A1 | 2/2014 |
| WO | 2014028095 A2 | 2/2014 |
| WO | 2014093826 A2 | 6/2014 |
| WO | 2014105108 A1 | 7/2014 |
| WO | 2014109819 A1 | 7/2014 |
| WO | 2014133635 A2 | 9/2014 |
| WO | 2014179381 A1 | 11/2014 |
| WO | 2015006026 A1 | 1/2015 |
| WO | 2015006440 A1 | 1/2015 |
| WO | 2015006479 A1 | 1/2015 |
| WO | 2015009448 A1 | 1/2015 |
| WO | 2015042089 A1 | 3/2015 |
| WO | 2015050987 A1 | 4/2015 |
| WO | 2015053833 A1 | 4/2015 |
| WO | 2015073068 A1 | 5/2015 |
| WO | 2015073657 A1 | 5/2015 |
| WO | 2015080854 A1 | 6/2015 |
| WO | 2015094636 A1 | 6/2015 |

OTHER PUBLICATIONS

European Search Report and Opinion issued in connection with related EP Application No. 16204602.3 dated May 12, 2017.
European Search Report and Opinion issued in connection with related EP Application No. 16204609.8 dated May 12, 2017.
European Search Report and Opinion issued in connection with related EP Application No. 16204610.6 dated May 17, 2017.
European Search Report and Opinion issued in connection with related EP Application No. 16204613.0 dated May 22, 2017.
European Search Report and Opinion issued in connection with related EP Application No. 16204605.6 dated May 26, 2017.
European Search Report and Opinion issued in connection with corresponding EP Application No. 16204607.2 dated May 26, 2017.
European Search Report and Opinion issued in connection with related EP Application No. 16204608.0 dated May 26, 2017.
European Search Report and Opinion issued in connection with related EP Application No. 16204617.1 dated May 26, 2017.
European Search Report and Opinion issued in connection with related EP Application No. 16204614.8.0 dated Jun. 2, 2017.
European Search Report and Opinion issued in connection with related EP Application No. 17168418.6 dated Aug. 10, 2017.
Ziegelheim, J. et al., "Diffusion bondability of similar/dissimilar light metal sheets," Journal of Materials Processing Technology 186.1 (May 2007): 87-93.
Liu et al, "Effect of nickel coating on bending properties of stereolithography photo-polymer SL5195", Materials & Design, vol. 26, Issue 6, pp. 493-496, 2005.

* cited by examiner

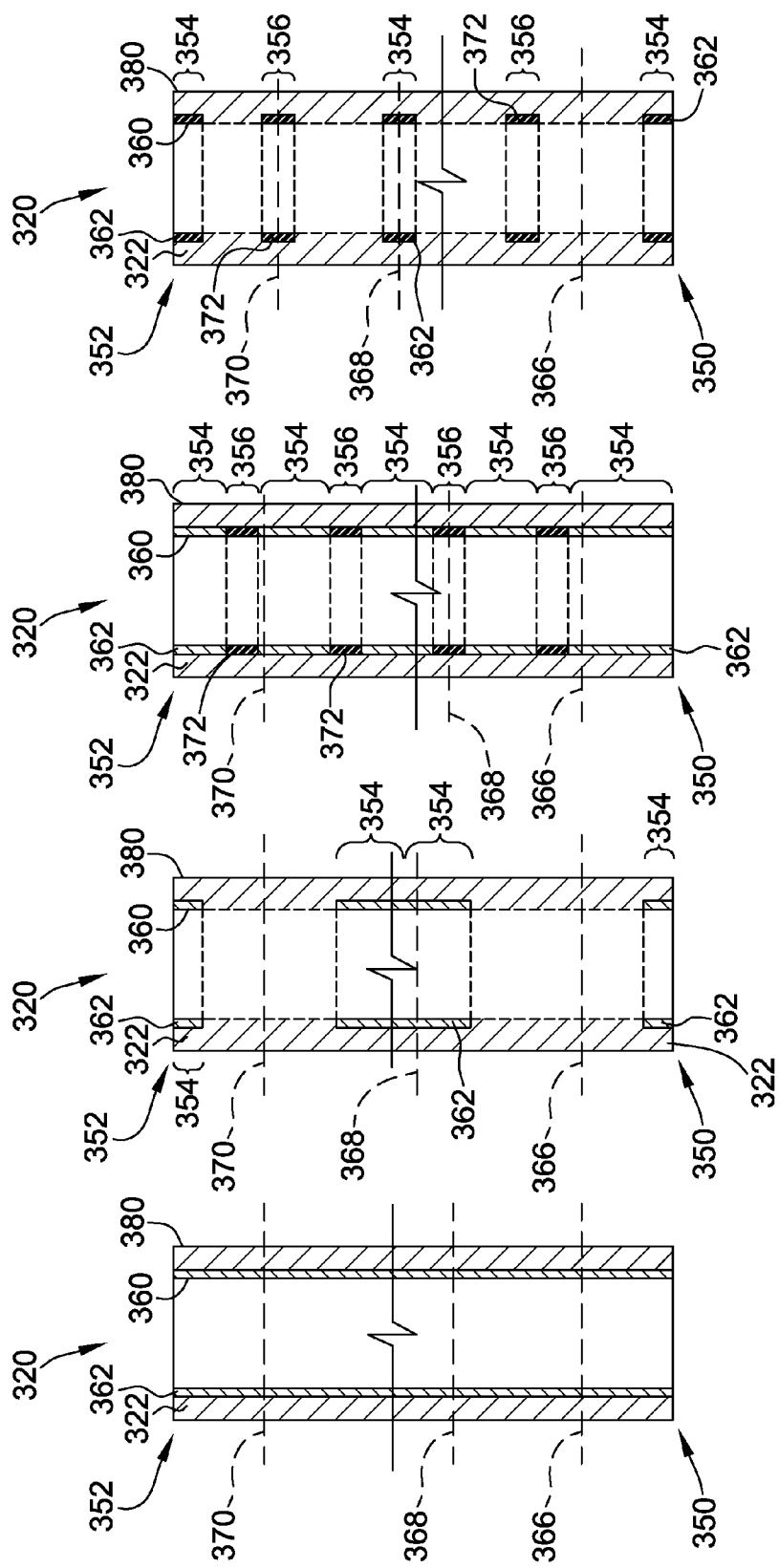

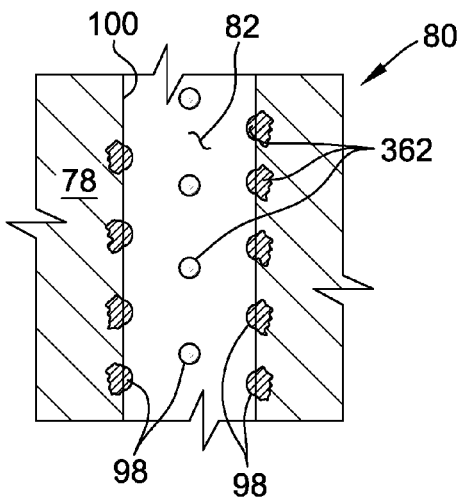
FIG. 11
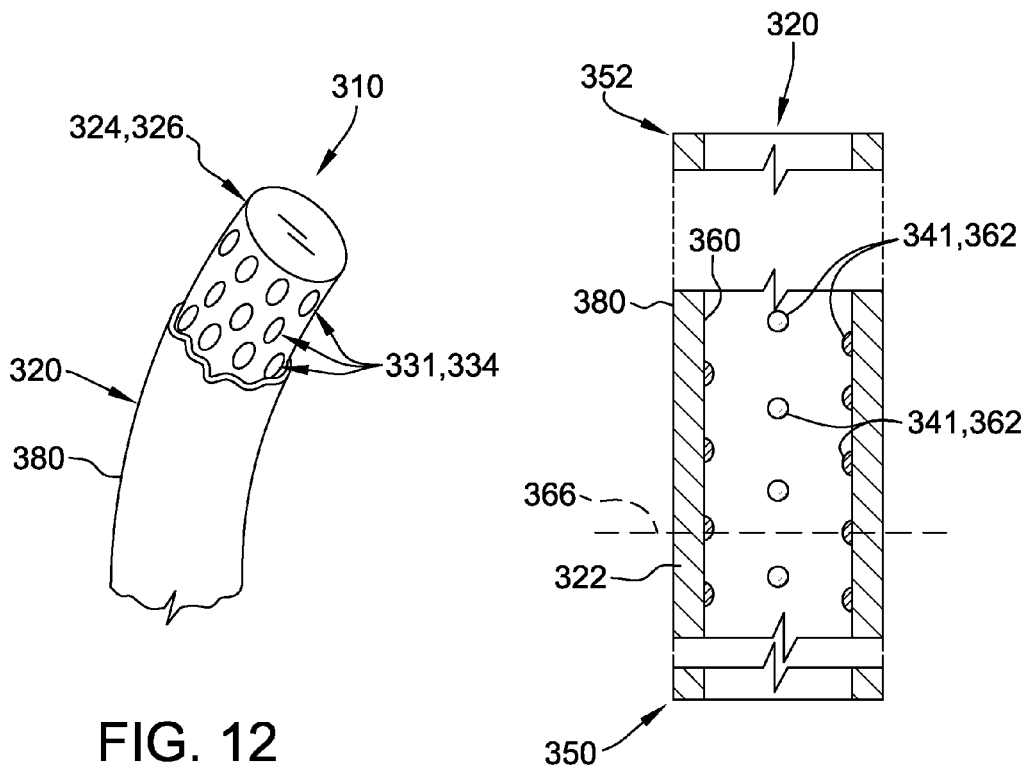
FIG. 12
FIG. 13

METHOD AND ASSEMBLY FOR FORMING COMPONENTS HAVING AN INTERNAL PASSAGE DEFINED THEREIN

BACKGROUND

The field of the disclosure relates generally to components having an internal passage defined therein, and more particularly to forming interior walls that define the internal passages using a plurality of materials.

Some components require an internal passage to be defined therein, for example, in order to perform an intended function. For example, but not by way of limitation, some components, such as hot gas path components of gas turbines, are subjected to high temperatures. At least some such components have internal passages defined therein to receive a flow of a cooling fluid, such that the components are better able to withstand the high temperatures. For another example, but not by way of limitation, some components are subjected to friction at an interface with another component. At least some such components have internal passages defined therein to receive a flow of a lubricant to facilitate reducing the friction.

At least some known components having an internal passage defined therein are formed in a mold, with a core of ceramic material extending within the mold cavity at a location selected for the internal passage. After a molten metal alloy is introduced into the mold cavity around the ceramic core and cooled to form the component, the ceramic core is removed, such as by chemical leaching, to form the internal passage. Alternatively or additionally, at least some known components having an internal passage defined therein are initially formed without the internal passage, and the internal passage is formed in a subsequent process. For example, at least some known internal passages are formed by drilling the passage into the component, such as, but not limited to, using an electrochemical drilling process. In each case, the interior wall that defines the internal passage is defined by the metal alloy used to form the component. Thus, if the interior wall defines, for example, a stress concentration at a particular point, the metal alloy used to cast the entire component must be chosen to satisfy the relatively higher strength needs at that particular point, potentially increasing a cost of the component.

In addition, at least some known components having an internal passage defined therein exhibit improved performance of the intended function after a coating is applied to the interior wall. However, such coatings can be difficult or cost-prohibitive to apply completely and/or evenly to certain internal passageways, such as, but not limited to, internal passageways characterized by a high degree of nonlinearity, a complex cross-section, and/or a large length-to-diameter ratio.

BRIEF DESCRIPTION

In one aspect, a method of forming a component having an internal passage defined therein is provided. The method includes positioning a jacketed core with respect to a mold. The jacketed core includes a hollow structure formed from at least a first material and a second material, and an inner core disposed within the hollow structure. The method also includes introducing a component material in a molten state into a cavity of the mold, and cooling the component material in the cavity to form the component. The inner core defines the internal passage within the component.

In another aspect, a mold assembly for use in forming a component having an internal passage defined therein is provided. The mold assembly includes a mold defining a mold cavity therein, and a jacketed core positioned with respect to the mold. The jacketed core includes a hollow structure formed from at least a first material and a second material, and an inner core disposed within the hollow structure. The inner core is positioned to define the internal passage within the component when a component material in a molten state is introduced into the mold cavity and cooled to form the component.

DRAWINGS

FIG. 7 is a schematic sectional view of an exemplary embodiment of a hollow structure for use in forming the jacketed core shown in FIG. 3;

FIG. 8 is a schematic sectional view of another exemplary embodiment of a hollow structure for use in forming the jacketed core shown in FIG. 3;

FIG. 9 is a schematic sectional view of another exemplary embodiment of a hollow structure for use in forming the jacketed core shown in FIG. 3;

FIG. 10 is a schematic sectional view of another exemplary embodiment of a hollow structure for use in forming the jacketed core shown in FIG. 3;

FIG. 11 is a schematic sectional view of a portion of another exemplary component for use with the rotary machine shown in FIG. 1;

FIG. 12 is a schematic perspective cutaway view of another exemplary jacketed core for use with the mold assembly shown in FIG. 3 to form the component shown in FIG. 11;

FIG. 13 is a schematic sectional view of an exemplary embodiment of a hollow structure for use in forming the jacketed core shown in FIG. 12;

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms such as "about," "approximately," and "substantially" is not to be limited to the precise value specified. In at least some instances, the approximating language may correspond to the precision of an instrument for measuring the value. Here and throughout the specification and claims, range limitations may be identified. Such ranges may be combined and/or interchanged, and include all the sub-ranges contained therein unless context or language indicates otherwise.

The exemplary components and methods described herein overcome at least some of the disadvantages associated with known assemblies and methods for forming a component having an internal passage defined therein, with a material other than the component material positioned proximate the internal passage. The embodiments described herein provide a jacketed core positioned with respect to a mold. The jacketed core includes a hollow structure and an inner core disposed within the hollow structure. The inner core extends within the mold cavity to define a position of the internal passage within the component to be formed in the mold. The hollow structure is formed from a first material and a second material. The second material is strategically distributed within the hollow structure, such as by an additive manufacturing process, such that the second material is selectively positioned along the internal passage when the component is formed in the mold.

Figure 1:
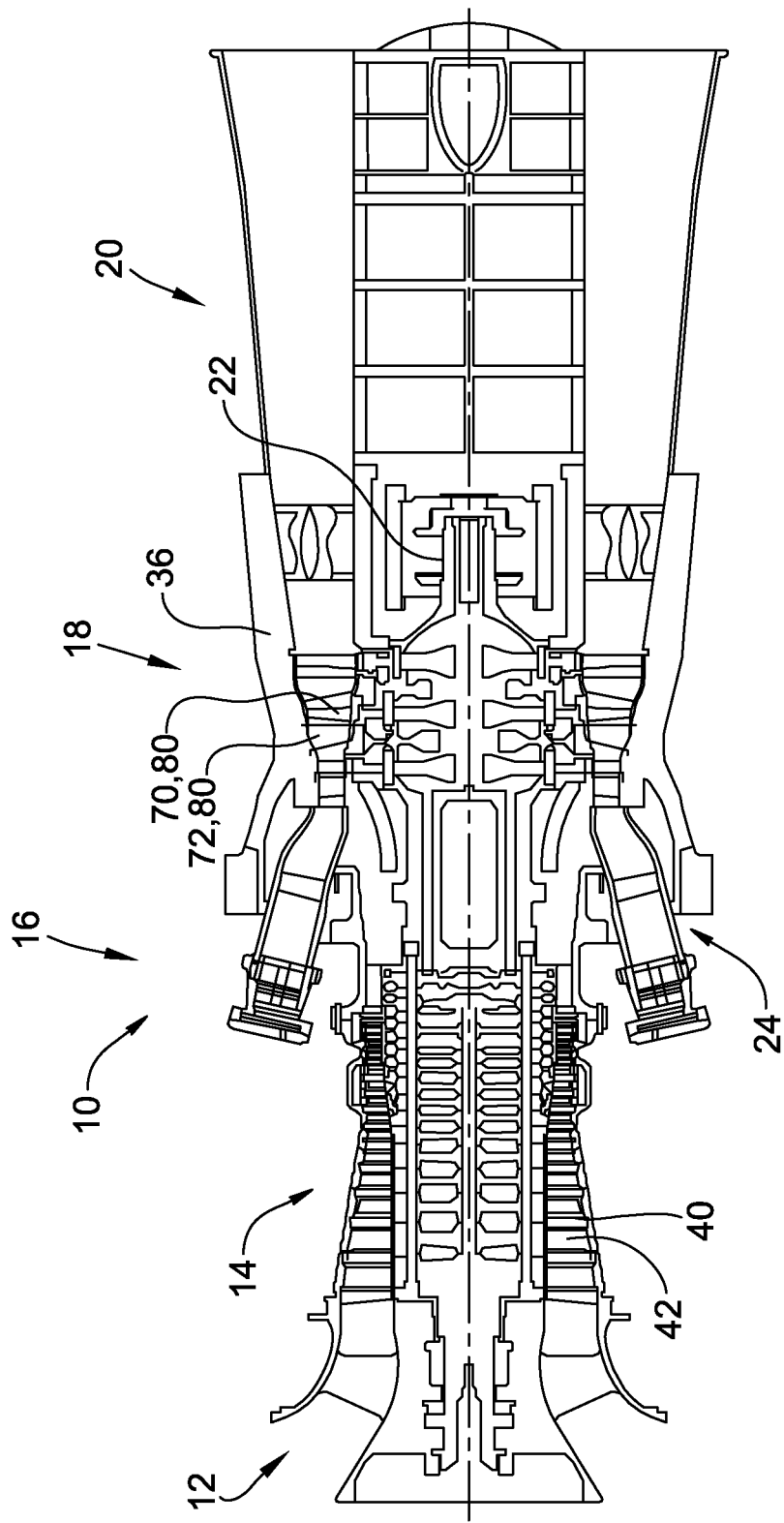
FIG. 1 is a schematic diagram of an exemplary rotary machine.

FIG. 1 is a schematic view of an exemplary rotary machine 10 having components for which embodiments of the current disclosure may be used. In the exemplary embodiment, rotary machine 10 is a gas turbine that includes an intake section 12, a compressor section 14 coupled downstream from intake section 12, a combustor section 16 coupled downstream from compressor section 14, a turbine section 18 coupled downstream from combustor section 16, and an exhaust section 20 coupled downstream from turbine section 18. A generally tubular casing 36 at least partially encloses one or more of intake section 12, compressor section 14, combustor section 16, turbine section 18, and exhaust section 20. In alternative embodiments, rotary machine 10 is any rotary machine for which components formed with internal passages as described herein are suitable. Moreover, although embodiments of the present disclosure are described in the context of a rotary machine for purposes of illustration, it should be understood that the embodiments described herein are applicable in any context that involves a component suitably formed with an internal passage defined therein.

In the exemplary embodiment, turbine section 18 is coupled to compressor section 14 via a rotor shaft 22. It should be noted that, as used herein, the term "couple" is not limited to a direct mechanical, electrical, and/or communication connection between components, but may also include an indirect mechanical, electrical, and/or communication connection between multiple components.

During operation of gas turbine 10, intake section 12 channels air towards compressor section 14. Compressor section 14 compresses the air to a higher pressure and temperature. More specifically, rotor shaft 22 imparts rotational energy to at least one circumferential row of compressor blades 40 coupled to rotor shaft 22 within compressor section 14. In the exemplary embodiment, each row of compressor blades 40 is preceded by a circumferential row of compressor stator vanes 42 extending radially inward from casing 36 that direct the air flow into compressor blades 40. The rotational energy of compressor blades 40 increases a pressure and temperature of the air. Compressor section 14 discharges the compressed air towards combustor section 16.

In combustor section 16, the compressed air is mixed with fuel and ignited to generate combustion gases that are channeled towards turbine section 18. More specifically, combustor section 16 includes at least one combustor 24, in which a fuel, for example, natural gas and/or fuel oil, is injected into the air flow, and the fuel-air mixture is ignited to generate high temperature combustion gases that are channeled towards turbine section 18.

Turbine section 18 converts the thermal energy from the combustion gas stream to mechanical rotational energy. More specifically, the combustion gases impart rotational energy to at least one circumferential row of rotor blades 70 coupled to rotor shaft 22 within turbine section 18. In the exemplary embodiment, each row of rotor blades 70 is preceded by a circumferential row of turbine stator vanes 72 extending radially inward from casing 36 that direct the combustion gases into rotor blades 70. Rotor shaft 22 may be coupled to a load (not shown) such as, but not limited to, an electrical generator and/or a mechanical drive application. The exhausted combustion gases flow downstream from turbine section 18 into exhaust section 20. Components of rotary machine 10 are designated as components 80. Components 80 proximate a path of the combustion gases are subjected to high temperatures during operation of rotary machine 10. Additionally or alternatively, components 80 include any component suitably formed with an internal passage defined therein.

Figure 2:
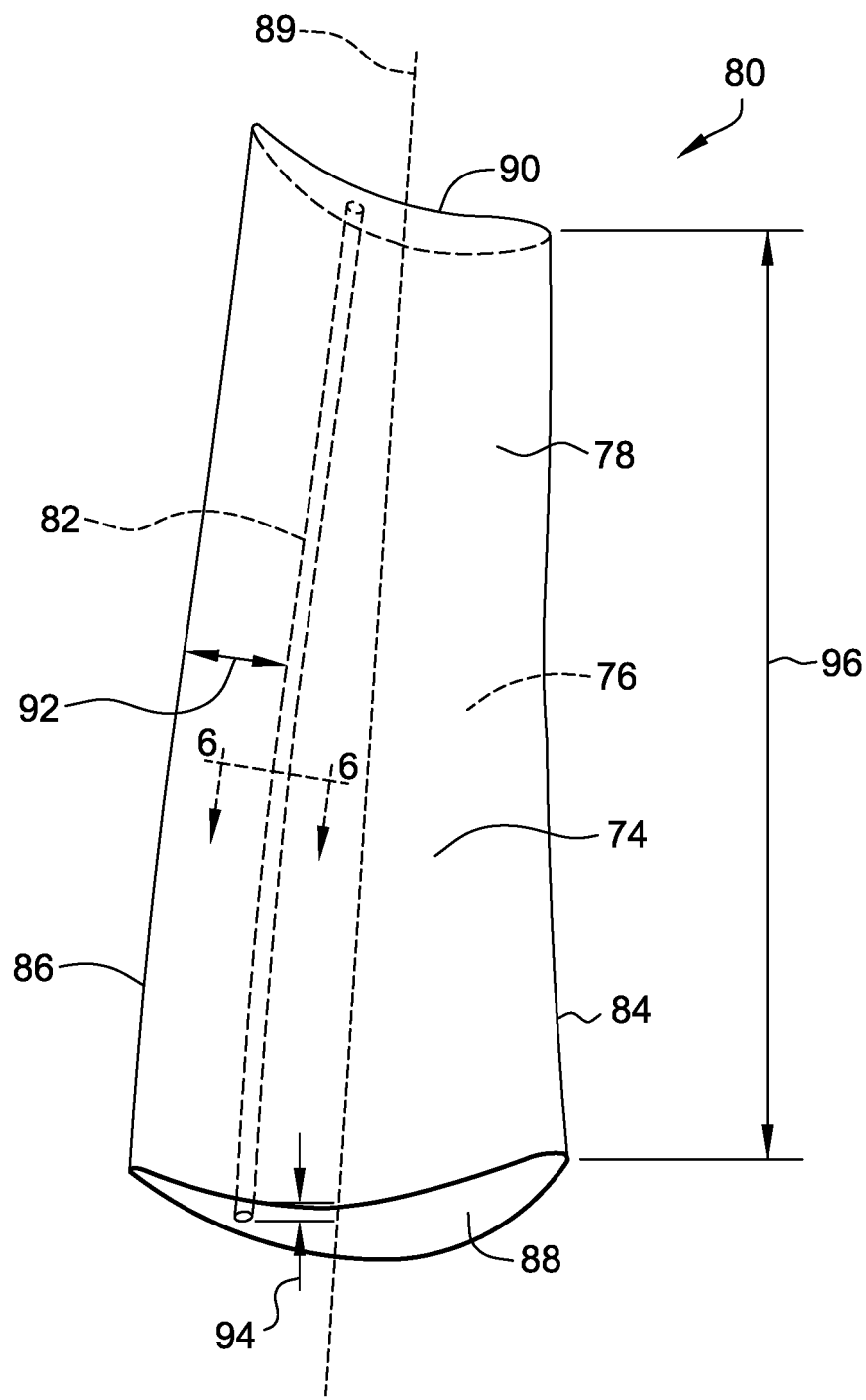
FIG. 2 is a schematic perspective view of an exemplary component for use with the rotary machine shown in FIG. 1.

FIG. 2 is a schematic perspective view of an exemplary component 80, illustrated for use with rotary machine 10 (shown in FIG. 1). Component 80 includes at least one internal passage 82 defined therein by an interior wall 100. For example, a cooling fluid is provided to internal passage 82 during operation of rotary machine 10 to facilitate maintaining component 80 below a temperature of the hot combustion gases. Although only one internal passage 82 is illustrated, it should be understood that component 80 includes any suitable number of internal passages 82 formed as described herein.

Component 80 is formed from a component material 78. In the exemplary embodiment, component material 78 is a suitable nickel-based superalloy. In alternative embodiments, component material 78 is at least one of a cobalt-based superalloy, an iron-based alloy, and a titanium-based alloy. In other alternative embodiments, component material 78 is any suitable material that enables component 80 to be formed as described herein.

In the exemplary embodiment, component 80 is one of rotor blades 70 or stator vanes 72. In alternative embodiments, component 80 is another suitable component of rotary machine 10 that is capable of being formed with an internal passage as described herein. In still other embodiments, component 80 is any component for any suitable application that is suitably formed with an internal passage defined therein.

In the exemplary embodiment, rotor blade 70, or alternatively stator vane 72, includes a pressure side 74 and an opposite suction side 76. Each of pressure side 74 and suction side 76 extends from a leading edge 84 to an opposite trailing edge 86. In addition, rotor blade 70, or alternatively stator vane 72, extends from a root end 88 to an opposite tip end 90, defining a blade length 96. In alternative embodiments, rotor blade 70, or alternatively stator vane 72, has any suitable configuration that is capable of being formed with an internal passage as described herein.

In certain embodiments, blade length 96 is at least about 25.4 centimeters (cm) (10 inches). Moreover, in some embodiments, blade length 96 is at least about 50.8 cm (20 inches). In particular embodiments, blade length 96 is in a range from about 61 cm (24 inches) to about 101.6 cm (40 inches). In alternative embodiments, blade length 96 is less than about 25.4 cm (10 inches). For example, in some embodiments, blade length 96 is in a range from about 2.54 cm (1 inch) to about 25.4 cm (10 inches). In other alternative embodiments, blade length 96 is greater than about 101.6 cm (40 inches).

In the exemplary embodiment, internal passage 82 extends from root end 88 to tip end 90. In alternative embodiments, internal passage 82 extends within component 80 in any suitable fashion, and to any suitable extent, that enables internal passage 82 to be formed as described herein. In certain embodiments, internal passage 82 is nonlinear. For example, component 80 is formed with a predefined twist along an axis 89 defined between root end 88 and tip end 90, and internal passage 82 has a curved shape complementary to the axial twist. In some embodiments, internal passage 82 is positioned at a substantially constant distance 94 from pressure side 74 along a length of internal passage 82. Alternatively or additionally, a chord of component 80 tapers between root end 88 and tip end 90, and internal passage 82 extends nonlinearly complementary to the taper, such that internal passage 82 is positioned at a substantially constant distance 92 from trailing edge 86 along the length of internal passage 82. In alternative embodiments, internal passage 82 has a nonlinear shape that is complementary to any suitable contour of component 80. In other alternative embodiments, internal passage 82 is nonlinear and other than complementary to a contour of component 80. In some embodiments, internal passage 82 having a nonlinear shape facilitates satisfying a preselected cooling criterion for component 80. In alternative embodiments, internal passage 82 extends linearly.

In some embodiments, internal passage 82 has a substantially circular cross-sectional perimeter. In alternative embodiments, internal passage 82 has a substantially ovoid cross-sectional perimeter. In other alternative embodiments, internal passage 82 has any suitably shaped cross-sectional perimeter that enables internal passage 82 to be formed as described herein. Moreover, in certain embodiments, a shape of the cross-sectional perimeter of internal passage 82 is substantially constant along a length of internal passage 82. In alternative embodiments, the shape of the cross-sectional perimeter of internal passage 82 varies along a length of internal passage 82 in any suitable fashion that enables internal passage 82 to be formed as described herein.

Figure 3:
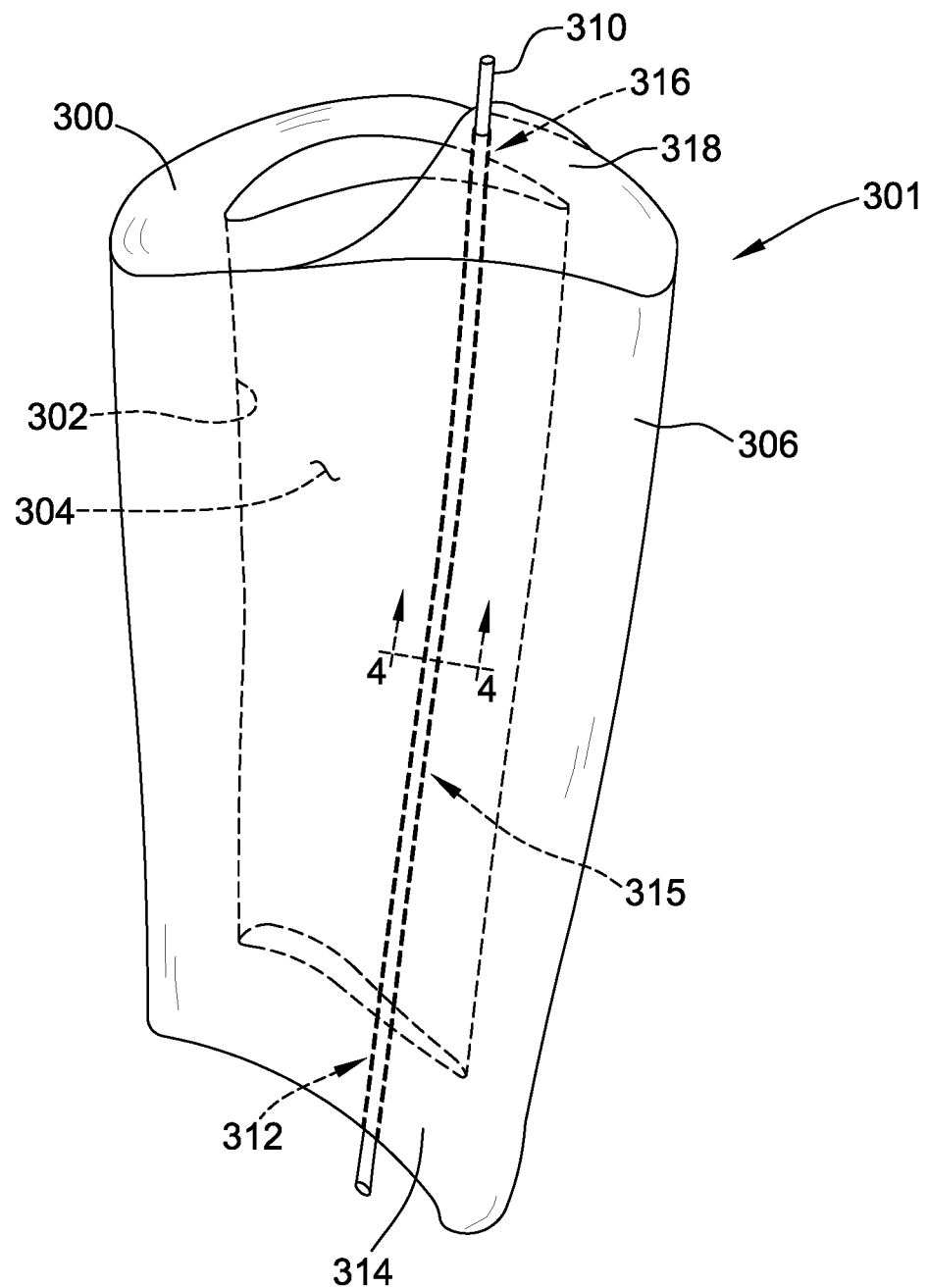
FIG. 3 is a schematic perspective view of an exemplary mold assembly for making the component shown in FIG. 2, the mold assembly including a jacketed core positioned with respect to a mold.
Figure 4:
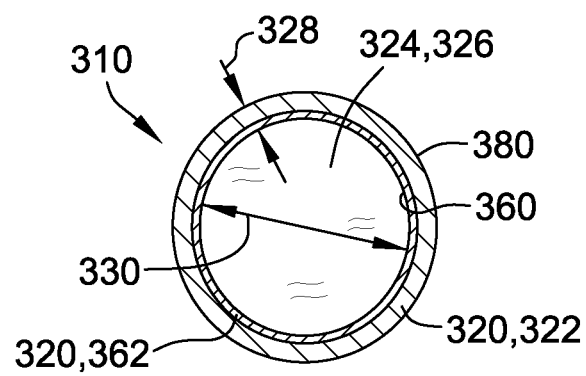
FIG. 4 is a schematic cross-section of an exemplary jacketed core for use with the mold assembly shown in FIG. 3, taken along lines 4-4 shown in FIG. 3.

FIG. 3 is a schematic perspective view of a mold assembly 301 for making component 80 (shown in FIG. 2). Mold assembly 301 includes a jacketed core 310 positioned with respect to a mold 300. FIG. 4 is a schematic cross-section of an embodiment of jacketed core 310 taken along lines 4-4 shown in FIG. 3. With reference to FIGS. 2-4, an interior wall 302 of mold 300 defines a mold cavity 304. Interior wall 302 defines a shape corresponding to an exterior shape of component 80, such that component material 78 in a molten state can be introduced into mold cavity 304 and cooled to form component 80. It should be recalled that, although component 80 in the exemplary embodiment is rotor blade 70, or alternatively stator vane 72, in alternative embodiments component 80 is any component suitably formable with an internal passage defined therein, as described herein.

Jacketed core 310 is positioned with respect to mold 300 such that a portion 315 of jacketed core 310 extends within mold cavity 304. Jacketed core 310 includes a hollow structure 320 formed from a first material 322 and a second material 362. Jacketed core 310 also includes an inner core 324 disposed within hollow structure 320 and formed from an inner core material 326. Inner core 324 is shaped to define a shape of internal passage 82, and inner core 324 of portion 315 of jacketed core 310 positioned within mold cavity 304 defines internal passage 82 within component 80 when component 80 is formed.

Hollow structure 320 includes an outer wall 380 that substantially encloses inner core 324 along a length of inner core 324. An interior portion 360 of hollow structure 320 is located interiorly with respect to outer wall 380, such that inner core 324 is complementarily shaped by interior portion 360 of hollow structure 320. In certain embodiments, hollow structure 320 defines a generally tubular shape. For example, but not by way of limitation, hollow structure 320 is initially formed from a substantially straight metal tube that is suitably manipulated into a nonlinear shape, such as a curved or angled shape, as necessary to define a selected nonlinear shape of inner core 324 and, thus, of internal passage 82. In alternative embodiments, hollow structure 320 defines any suitable shape that enables inner core 324 to define a shape of internal passage 82 as described herein.

In the exemplary embodiment, hollow structure 320 has a wall thickness 328 that is less than a characteristic width 330 of inner core 324. Characteristic width 330 is defined herein as the diameter of a circle having the same cross-sectional area as inner core 324. In alternative embodiments, hollow structure 320 has a wall thickness 328 that is other than less than characteristic width 330. A shape of a cross-section of inner core 324 is circular in the exemplary embodiment shown in FIGS. 3-5. Alternatively, the shape of the cross-section of inner core 324 corresponds to any suitable shape of the cross-section of internal passage 82 that enables internal passage 82 to function as described herein.

In certain embodiments, first material 322 is selected to provide structural support to jacketed core 310. In the exemplary embodiment, hollow core 320 includes second material 362 disposed adjacent at least a portion of inner core 324, and first material 322 disposed adjacent outer wall 380. More specifically, second material 362 defines interior portion 360 of hollow structure 320, and first material 322 defines outer wall 380 of hollow structure 320. In alternative embodiments, first material 322 and second material 362 are disposed in any suitable arrangement within hollow structure 320 that enables hollow structure 320 to function as described herein.

In some embodiments, second material 362 is selected to enhance a performance of internal passage 82 after component 80 is formed, as will be described herein. For example, but not by way of limitation, second material 362 is selected to inhibit oxidation of component material 78 along interior wall 100. Additionally or alternatively, but not by way of limitation, second material 362 is selected to inhibit corrosion of component material 78 along interior wall 100. Additionally or alternatively, but not by way of limitation, second material 362 is selected to inhibit deposition of carbon on component material 78 along interior wall 100. Additionally or alternatively, but not by way of limitation, second material 362 is selected to provide a thermal barrier for component material 78 along interior wall 100. Additionally or alternatively, but not by way of limitation, first coating material 366 is selected to provide a water vapor barrier for component material 78 along interior wall 100. Additionally or alternatively, but not by way of limitation, second material 362 is selected to inhibit wear, such as but not limited to erosion, of component material 78 along interior wall 100. Additionally or alternatively, second material 362 is selected to be any suitable material that provides or facilitates any other selected characteristic of internal passage 82 when disposed along interior wall 100. In addition, although second material 362 is referred to as a single material, it should be understood that, in some embodiments, second material 362 includes a mixture of a plurality of performance-enhancing constituents.

Figure 5:
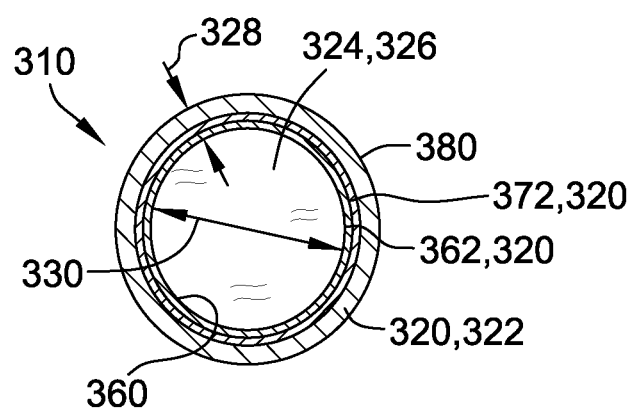
FIG. 5 is a schematic cross-section of another exemplary jacketed core for use with the mold assembly shown in FIG. 3, taken along lines 4-4 shown in FIG. 3.

In certain embodiments, hollow structure 320 is formed from any suitable number of materials in addition to first material 322 and second material 362. For example, FIG. 5 is a schematic cross-section of another embodiment of jacketed core 310 taken along lines 4-4 shown in FIG. 3. In the exemplary embodiment, jacketed core 310 includes second material 362 disposed adjacent at least a portion of inner core 324, first material 322 disposed adjacent outer wall 380, and at least a third material 372 disposed radially between second material 362 and first material 322. In some embodiments, second material 362 again is selected from at least one of (i) an oxidation-inhibiting material, (ii) a corrosion-inhibiting material, (iii) a carbon-deposition-inhibiting material, (iv) a thermal barrier material, (v) a water vapor barrier material, and (vi) a wear-inhibiting material, and third material 372 is selected from another of (i) an oxidation-inhibiting material, (ii) a corrosion-inhibiting material, (iii) a carbon-deposition-inhibiting material, (iv) a thermal barrier material, (v) a water vapor barrier material, and (vi) a wear-inhibiting material. In alternative embodiments, third material 372 is a bond coat material that facilitates bonding of second material 362 to at least one of first material 322 and component material 78. In other alternative embodiments, third material 372 is any suitable material that enables jacketed core 310 to function as described herein.

With reference to FIGS. 2-5, mold 300 is formed from a mold material 306. In the exemplary embodiment, mold material 306 is a refractory ceramic material selected to withstand a high temperature environment associated with the molten state of component material 78 used to form component 80. In alternative embodiments, mold material 306 is any suitable material that enables component 80 to be formed as described herein. Moreover, in the exemplary embodiment, mold 300 is formed by a suitable investment casting process. For example, but not by way of limitation, a suitable pattern material, such as wax, is injected into a suitable pattern die to form a pattern (not shown) of component 80, the pattern is repeatedly dipped into a slurry of mold material 306 which is allowed to harden to create a shell of mold material 306, and the shell is dewaxed and fired to form mold 300. In alternative embodiments, mold 300 is formed by any suitable method that enables mold 300 to function as described herein.

In certain embodiments, jacketed core 310 is secured relative to mold 300 such that jacketed core 310 remains fixed relative to mold 300 during a process of forming component 80. For example, jacketed core 310 is secured such that a position of jacketed core 310 does not shift during introduction of molten component material 78 into mold cavity 304 surrounding jacketed core 310. In some embodiments, jacketed core 310 is coupled directly to mold 300. For example, in the exemplary embodiment, a tip portion 312 of jacketed core 310 is rigidly encased in a tip portion 314 of mold 300. Additionally or alternatively, a root portion 316 of jacketed core 310 is rigidly encased in a root portion 318 of mold 300 opposite tip portion 314. For example, but not by way of limitation, mold 300 is formed by investment casting as described above, and jacketed core 310 is securely coupled to the suitable pattern die such that tip portion 312 and root portion 316 extend out of the pattern die, while portion 315 extends within a cavity of the die. The pattern material is injected into the die around jacketed core 310 such that portion 315 extends within the pattern. The investment casting causes mold 300 to encase tip portion 312 and/or root portion 316. Additionally or alternatively, jacketed core 310 is secured relative to mold 300 in any other suitable fashion that enables the position of jacketed core 310 relative to mold 300 to remain fixed during a process of forming component 80.

First material 322 is selected to be at least partially absorbable by molten component material 78. In certain embodiments, component material 78 is an alloy, and first material 322 is at least one constituent material of the alloy. For example, in the exemplary embodiment, component material 78 is a nickel-based superalloy, and first material 322 is substantially nickel, such that first material 322 is substantially absorbable by component material 78 when component material 78 in the molten state is introduced into mold cavity 304. In alternative embodiments, component material 78 is any suitable alloy, and first material 322 is at least one material that is at least partially absorbable by the molten alloy. For example, component material 78 is a cobalt-based superalloy, and first material 322 is substantially cobalt. For another example, component material 78 is an iron-based alloy, and first material 322 is substantially iron. For another example, component material 78 is a titanium-based alloy, and first material 322 is substantially titanium.

In certain embodiments, second material 362 also is selected to be at least partially absorbable by molten component material 78, as described above with respect to first material 322. For example, component material 78 is a first alloy of a base metal, and second material 362 is a second alloy of the same base metal. In some such embodiments, second material 362 is selected to have an improved physical characteristic, such as, but not limited to, an improved structural strength characteristic, as compared to component material 78. Moreover, in some embodiments in which hollow structure 320 includes materials in addition to first material 322 and second material 362, the additional materials, such as, but not limited to, third material 372, also are selected to be at least partially absorbable by molten component material 78, as described above with respect to first material 322 and second material 362.

In certain embodiments, wall thickness 328 is sufficiently thin such that first material 322 and second material 362 of portion 315 of jacketed core 310, that is, the portion that extends within mold cavity 304, are substantially absorbed by component material 78 when component material 78 in the molten state is introduced into mold cavity 304. For example, in some such embodiments, first material 322 and second material 362 are substantially absorbed by component material 78 such that no discrete boundary delineates hollow structure 320 from component material 78 after component material 78 is cooled. Moreover, in some such embodiments, first material 322 and second material 362 are substantially absorbed such that, after component material 78 is cooled, first material 322 and second material 362 are substantially uniformly distributed within component material 78. For example, each of a concentration of first material 322 and a concentration of second material 362 proximate inner core 324 is not detectably higher than a concentration of first material 322 and a concentration of second material 362 at other locations within component 80.

In alternative embodiments, wall thickness 328 is selected such that at least one of first material 322 and second material 362 are other than substantially absorbed by component material 78. For example, in some embodiments, after component material 78 is cooled, at least one of first material 322 and second material 362 is other than substantially uniformly distributed within component material 78. For example, at least one of a concentration of first material 322 proximate inner core 324 and a concentration of second material 362 is detectably higher than a respective concentration of first material 322 or second material 362 at other locations within component 80. In some such embodiments, at least one of first material 322 and second material 362 are partially absorbed by component material 78 such that a discrete boundary delineates hollow structure 320 from component material 78 after component material 78 is cooled. Moreover, in some such embodiments, at least one of first material 322 and second material 362 are partially absorbed by component material 78 such that at least a portion of hollow structure 320 proximate inner core 324 remains intact after component material 78 is cooled.

In some such embodiments, after component 80 is formed, a concentration of second material 362 proximate inner core 324 is detectably higher than a concentration of second material 362 at other locations within component 80. Thus, after inner core 324 is removed from component 80 to form internal passage 82, the concentration of second material 362 proximate interior wall 100 is detectably higher than the concentration of second material 362 at other locations within component 80. Moreover, in some such embodiments, second material 362 lines at least a portion of interior wall 100 that defines internal passage 82.

Figure 6:
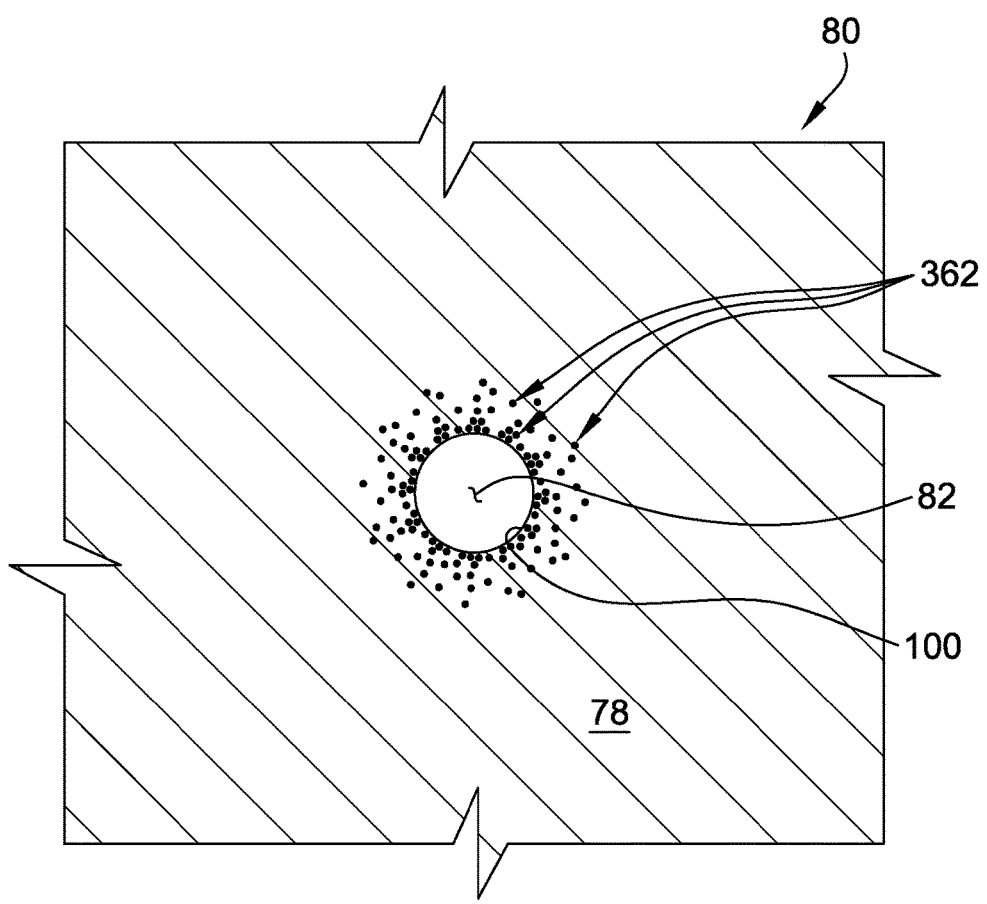
FIG. 6 is a cross-section of the component of FIG. 2, taken along lines 6-6 shown in FIG. 2.

For example, FIG. 6 is a cross-section of component 80 taken along lines 6-6 shown in FIG. 2, and schematically illustrates a gradient distribution of second material 362 proximate interior wall 100. A distribution of first material 322 within component 80 is omitted from FIG. 6 for clarity. In some embodiments, a concentration of second material 362 proximate interior wall 100 is sufficient to establish at least one material characteristic associated with second material 362 along at least a portion of interior wall 100. Moreover, in some embodiments, a concentration of second material 362 proximate interior wall 100 is sufficient such that at least a portion of second material 362 lines at least a portion of interior wall 100 that defines internal passage 82.

Moreover, in certain embodiments in which hollow structure 320 includes materials in addition to first material 322 and second material 362, the additional materials, such as, but not limited to, third material 372, are distributed proximate interior wall 100 in similar fashion after component 80 is formed. For example, a concentration of third material 372 proximate interior wall 100 is sufficient such that third material 372 lines at least a portion of interior wall 100 that defines internal passage 82. For another example, third material 372 is a bond coat material, and a concentration of third material 372 proximate interior wall 100 is sufficient to facilitate bonding second material 362 to component material 78 and/or first material 322 proximate interior wall 100.

In the exemplary embodiment, inner core material 326 is a refractory ceramic material selected to withstand a high temperature environment associated with the molten state of component material 78 used to form component 80. For example, but without limitation, inner core material 326 includes at least one of silica, alumina, and mullite. Moreover, in the exemplary embodiment, inner core material 326 is selectively removable from component 80 to form internal passage 82. For example, but not by way of limitation, inner core material 326 is removable from component 80 by a suitable process that does not substantially degrade component material 78, such as, but not limited to, a suitable chemical leaching process. In certain embodiments, inner core material 326 is selected based on a compatibility with, and/or a removability from, component material 78, first material 322, and/or second material 362. In alternative embodiments, inner core material 326 is any suitable material that enables component 80 to be formed as described herein.

In some embodiments, jacketed core 310 is formed by filling hollow structure 320 with inner core material 326. For example, but not by way of limitation, inner core material 326 is injected as a slurry into hollow structure 320, and inner core material 326 is dried within hollow structure 320 to form jacketed core 310. Moreover, in certain embodiments, hollow structure 320 substantially structurally reinforces inner core 324, thus reducing potential problems that would be associated with production, handling, and use of an unreinforced inner core 324 to form component 80 in some embodiments. For example, in certain embodiments, inner core 324 is a relatively brittle ceramic material subject to a relatively high risk of fracture, cracking, and/or other damage. Thus, in some such embodiments, forming and transporting jacketed core 310 presents a much lower risk of damage to inner core 324, as compared to using an unjacketed inner core 324. Similarly, in some such embodiments, forming a suitable pattern around jacketed core 310 to be used for investment casting of mold 300, such as by injecting a wax pattern material into a pattern die around jacketed core 310, presents a much lower risk of damage to inner core 324, as compared to using an unjacketed inner core 324. Thus, in certain embodiments, use of jacketed core 310 presents a much lower risk of failure to produce an acceptable component 80 having internal passage 82 defined therein, as compared to the same steps if performed using an unjacketed inner core 324 rather than jacketed core 310. Thus, jacketed core 310 facilitates obtaining advantages associated with positioning inner core 324 with respect to mold 300 to define internal passage 82, while reducing or eliminating fragility problems associated with inner core 324. In alternative embodiments, hollow structure 320 does not substantially structurally reinforce inner core 324.

For example, in certain embodiments, such as, but not limited to, embodiments in which component 80 is rotor blade 70, characteristic width 330 of inner core 324 is within a range from about 0.050 cm (0.020 inches) to about 1.016 cm (0.400 inches), and wall thickness 328 of hollow structure 320 is selected to be within a range from about 0.013 cm (0.005 inches) to about 0.254 cm (0.100 inches). More particularly, in some such embodiments, characteristic width 330 is within a range from about 0.102 cm (0.040 inches) to about 0.508 cm (0.200 inches), and wall thickness 328 is selected to be within a range from about 0.013 cm (0.005 inches) to about 0.038 cm (0.015 inches). For another example, in some embodiments, such as, but not limited to, embodiments in which component 80 is a stationary component, such as but not limited to stator vane 72, characteristic width 330 of inner core 324 is greater than about 1.016 cm (0.400 inches), and/or wall thickness 328 is selected to be greater than about 0.254 cm (0.100 inches). In alternative embodiments, characteristic width 330 is any suitable value that enables the resulting internal passage 82 to perform its intended function, and wall thickness 328 is selected to be any suitable value that enables jacketed core 310 to function as described herein.

In certain embodiments, hollow structure 320 is formed using a suitable additive manufacturing process. For example, FIG. 7 is a schematic sectional view of an embodiment of hollow structure 320 formed from first material 322 and second material 362. In the exemplary embodiment, hollow structure 320 extends from a first end 350 to an opposite second end 352, and includes a radially inner layer of second material 362 and a radially outer layer of first material 322 that each extend from first end 350 to second end 352, such that second material 362 defines interior portion 360 of hollow structure 320 and first material 322 defines outer wall 380 of hollow structure 320.

To form hollow structure 320, a computer design model of hollow structure 320 is sliced into a series of thin, parallel planes between first end 350 and second end 352, such that a distribution of each of first material 322 and second material 362 within each plane is defined. A computer numerically controlled (CNC) machine deposits successive layers of first material 322 and second material 362 from first end 350 to second end 352 in accordance with the model slices to form hollow structure 320. For example, the additive manufacturing process is suitably configured for alternating deposition of each of a plurality of metallic and/or metallic and ceramic materials, and the alternating deposition is suitably controlled according to the computer design model to produce the defined distribution of first material 322 and second material 362 in each layer. Three such representative layers are indicated as layers 366, 368, and 370. In some embodiments, the successive layers each including first material 322 and second material 362 are deposited using at least one of a direct metal laser melting (DMLM) process, a direct metal laser sintering (DMLS) process, a selective laser sintering (SLS) process, an electron beam melting (EBM) process, a selective laser melting process (SLM), and a robocasting extrusion-type additive process. Additionally or alternatively, the successive layers of first material 322 and second material 362 are deposited using any suitable process that enables hollow structure 320 to be formed as described herein.

In some embodiments, the formation of hollow structure 320 by an additive manufacturing process enables hollow structure 320 to be formed with a distribution of second material 362 that would be difficult and/or relatively more costly to produce by other methods of forming hollow structure 320. Correspondingly, the formation of hollow structure 320 by an additive manufacturing process enables component 80 to be formed with an integral distribution of second material 362 proximate interior wall 100 (shown, for example, in FIG. 6) that would be difficult and/or relatively more costly to (i) produce by other methods of forming component 80, and/or (ii) add to component 80 in a separate process after initial formation of component 80 in mold 300.

For another example, FIG. 8 is a schematic sectional view of another embodiment of hollow structure 320 formed from first material 322 and second material 362. In the exemplary embodiment, hollow structure 320 again includes a layer of first material 322 that extends from first end 350 to second end 352. Hollow structure 320 also includes a layer of second material 362 that extends over at least one predefined first longitudinal portion 354 of interior portion 360 of hollow structure 320, radially inward of first material 322. In the exemplary embodiment, the at least one predefined first longitudinal portion 354 is a plurality of spaced apart first longitudinal portions 354.

To form hollow structure 320, a computer design model of hollow structure 320 is again sliced into a series of thin, parallel planes between first end 350 and second end 352, such that a distribution of each of first material 322 and, for first longitudinal portions 354, second material 362 within each plane is defined. A computer numerically controlled (CNC) machine deposits successive layers of first material 322 and, for first longitudinal portions 354, second material 362 from first end 350 to second end 352 in accordance with the model slices to form hollow structure 320. For example, the additive manufacturing process is suitably configured for alternating deposition of each of a plurality of metallic and/or metallic and ceramic materials, and the alternating deposition is suitably controlled according to the computer design model to produce the defined distribution of first material 322 and, for first longitudinal portions 354, second material 362 in each layer. Three such representative layers are indicated as layers 366, 368, and 370. In some embodiments, the successive layers each including first material 322 and, for first longitudinal portions 354, second material 362 are deposited using at least one of a direct metal laser melting (DMLM) process, a direct metal laser sintering (DMLS) process, a selective laser sintering (SLS) process, an electron beam melting (EBM) process, a selective laser melting process (SLM), and a robocasting extrusion-type additive process. Additionally or alternatively, the successive layers of first material 322 and second material 362 are deposited using any suitable process that enables hollow structure 320 to be formed as described herein.

In some embodiments, the formation of hollow structure 320 by an additive manufacturing process again enables hollow structure 320 to be formed with a distribution of second material 362 that would be difficult and/or relatively more costly to produce by other methods of forming hollow structure 320. Correspondingly, the formation of hollow structure 320 by an additive manufacturing process enables component 80 again to be formed with an integral distribution of second material 362 proximate interior wall 100 (shown in FIG. 6) that would be difficult and/or relatively more costly to (i) produce by other methods of forming component 80, and/or (ii) add to component 80 in a separate process after initial formation of component 80 in mold 300. In particular, the formation of hollow structure 320 by an additive manufacturing process enables component 80 to be formed with second material 362 distributed only at selected longitudinal locations along interior wall 100. For example, in certain embodiments, second material 362 is relatively expensive, and the formation of hollow structure 320 by an additive manufacturing process enables second material 362 to be located only at first longitudinal portions 354 of hollow structure 320 corresponding to locations along internal passage 82 where use of second material 362 is necessary to achieve a specified design criterion, thereby reducing a cost associated with distributing second material 362 along an entire length of internal passage 82.

For another example, FIG. 9 is a schematic sectional view of another embodiment of hollow structure 320 formed from first material 322, second material 362, and third material 372. In the exemplary embodiment, hollow structure 320 again includes a layer of first material 322 that extends from first end 350 to second end 352. Hollow structure 320 also includes a layer of second material 362 that extends over at least one predefined first longitudinal portion 354 of interior portion 360 of hollow structure 320 radially inward of first material 322, and a layer of third material 372 that extends over at least one predefined second longitudinal portion 356 of interior portion 360 of hollow structure 320 radially inward of first material 322. In the exemplary embodiment, the at least one predefined first longitudinal portion 354 is a plurality of first longitudinal portions 354, and the at least one predefined second longitudinal portion 356 is a plurality of second longitudinal portions 356 that alternate with the plurality of first longitudinal portions 354 along interior portion 360.

To form hollow structure 320, a computer design model of hollow structure 320 is again sliced into a series of thin, parallel planes between first end 350 and second end 352, such that a distribution within each plane of each of first material 322, second material 362 for first longitudinal portions 354, and third material 372 for second longitudinal portions 356, is defined. A computer numerically controlled (CNC) machine deposits successive layers of first material 322, second material 362, and/or third material 372 from first end 350 to second end 352 in accordance with the model slices to form hollow structure 320. For example, the additive manufacturing process is suitably configured for alternating deposition of each of a plurality of metallic and/or metallic and ceramic materials, and the alternating deposition is suitably controlled according to the computer design model to produce the defined distribution of first material 322 and, for first longitudinal portions 354, second material 362, and, for second longitudinal portions 356, third material 372 in each layer. Three such representative layers are indicated as layers 366, 368, and 370. In some embodiments, the successive layers each including first material 322 and, for first longitudinal portions 354, second material 362, and, for second longitudinal portions 356, third material 372 are deposited using at least one of a direct metal laser melting (DMLM) process, a direct metal laser sintering (DMLS) process, a selective laser sintering (SLS) process, an electron beam melting (EBM) process, a selective laser melting process (SLM), and a robocasting extrusion-type additive process. Additionally or alternatively, the successive layers of first material 322, second material 362, and/or third material 372 are deposited using any suitable process that enables hollow structure 320 to be formed as described herein.

In some embodiments, the formation of hollow structure 320 by an additive manufacturing process enables hollow structure 320 to be formed with a distribution of second material 362 and third material 372 that would be difficult and/or relatively more costly to produce by other methods of forming hollow structure 320. Correspondingly, the formation of hollow structure 320 by an additive manufacturing process enables component 80 to be formed with an integral distribution of second material 362 proximate selected portions of interior wall 100 (shown in FIG. 6), and a similar integral distribution of third material 372 proximate other selected portions of interior wall 100, that would be difficult and/or relatively more costly to (i) produce by other methods of forming component 80, and/or (ii) add to component 80 in a separate process after initial formation of component 80 in mold 300. In particular, the formation of hollow structure 320 by an additive manufacturing process enables component 80 to be formed with each of second material 362 and third material 372 distributed only at selected respective longitudinal locations along interior wall 100. For example, in certain embodiments, second material 362 provides a thermal barrier of a first effectiveness and third material 372 provides a thermal barrier of a second, greater effectiveness and is correspondingly more expensive, and the formation of hollow structure 320 by an additive manufacturing process enables third material 372 to be located only at second longitudinal portions 356 of hollow structure 320 corresponding to locations along internal passage 82 where use of third material 372 is necessary to achieve a specified design thermal criterion, thereby reducing a cost associated with distributing third material 372 along an entire length of internal passage 82.

For another example, FIG. 10 is a schematic sectional view of another embodiment of hollow structure 320 formed from first material 322, second material 362, and third material 372. The exemplary embodiment is substantially similar to the embodiment shown in FIG. 9, except that at least one of plurality of second longitudinal portions 356 and plurality of first longitudinal portions 354 is spaced apart along interior portion 360 from others of plurality of second longitudinal portions 356 and plurality of first longitudinal portions 354.

To form hollow structure 320, a computer design model of hollow structure 320 is again sliced into a series of thin, parallel planes between first end 350 and second end 352, such that a distribution within each plane of each of first material 322, second material 362 for first longitudinal portions 354, and third material 372 for second longitudinal portions 356, is defined. A computer numerically controlled (CNC) machine deposits successive layers of first material 322, second material 362, and/or third material 372 from first end 350 to second end 352 in accordance with the model slices to form hollow structure 320. For example, the additive manufacturing process is suitably configured for alternating deposition of each of a plurality of metallic and/or metallic and ceramic materials, and the alternating deposition is suitably controlled according to the computer design model to produce the defined distribution of first material 322 and, for first longitudinal portions 354, second material 362, and, for second longitudinal portions 356, third material 372 in each layer. Three such representative layers are indicated as layers 366, 368, and 370. In some embodiments, the successive layers each including first material 322 and, for first longitudinal portions 354, second material 362, and, for second longitudinal portions 356, third material 372 are deposited using at least one of a direct metal laser melting (DMLM) process, a direct metal laser sintering (DMLS) process, a selective laser sintering (SLS) process, an electron beam melting (EBM) process, a selective laser melting process (SLM), and a robocasting extrusion-type additive process. Additionally or alternatively, the successive layers of first material 322, second material 362, and/or third material 372 are deposited using any suitable process that enables hollow structure 320 to be formed as described herein.

In some embodiments, the formation of hollow structure 320 by an additive manufacturing process again enables hollow structure 320 to be formed with a distribution of second material 362 and third material 372 that would be difficult and/or relatively more costly to produce by other methods of forming hollow structure 320. Correspondingly, the formation of hollow structure 320 by an additive manufacturing process enables component 80 to be formed with an integral distribution of second material 362 proximate selected portions of interior wall 100 (shown in FIG. 6), and a similar integral distribution of third material 372 proximate other selected portions of interior wall 100, that would be difficult and/or relatively more costly to (i) produce by other methods of forming component 80, and/or (ii) add to component 80 in a separate process after initial formation of component 80 in mold 300. In particular, the formation of hollow structure 320 by an additive manufacturing process enables component 80 to be formed with each of second material 362 and third material 372 distributed only at selected respective longitudinal locations along interior wall 100. For example, in certain embodiments, second material 362 provides a thermal barrier of a first effectiveness and is more expensive than first material 322, and third material 372 provides a thermal barrier of a second, greater effectiveness and is more expensive than second material 362. The formation of hollow structure 320 by an additive manufacturing process enables second material 362 to be located only at first longitudinal portions 354 of hollow structure 320 corresponding to locations along internal passage 82 where use of second material 362 is necessary to achieve a first specified design thermal criterion, and third material 372 to be located only at second longitudinal portions 356 of hollow structure 320 corresponding to locations along internal passage 82 where use of third material 372 is necessary to achieve a second, more stringent specified design thermal criterion, thereby reducing a cost associated with distributing at least one of second material 362 and third material 372 along an entire length of internal passage 82.

FIG. 11 is a schematic sectional view of a portion of another exemplary component 80 that includes internal passage 82 having a plurality of interior passage features 98. FIG. 12 is a schematic perspective cutaway view of another exemplary jacketed core 310 for use in mold assembly 301 to form component 80 having interior passage features 98 as shown in FIG. 11. In particular, a portion of hollow structure 320 is cut away in the view of FIG. 12 to illustrate features of inner core 324. FIG. 13 is a schematic sectional view of a portion of another hollow structure 320 for use in forming jacketed core 310. Hollow structure 320 again is formed from first material 322 and second material 362.

With reference to FIGS. 11-13, internal passage 82 again is generally defined by interior wall 100 of component 80, and interior passage features 98 are shaped to define local variations in a flow path defined by internal passage 82. For example, but not by way of limitation, interior passage features 98 are turbulators that extend radially inward from interior wall 100 generally towards a center of internal passage 82, and are shaped to disrupt a thermal boundary layer flow along interior wall 100 to improve a heat transfer capability of a cooling fluid provided to internal passage 82 during operation of rotary machine 10 (shown in FIG. 1). Alternatively, interior passage features 98 are any structure shaped to define local variations in the flow path defined by internal passage 82. In the exemplary embodiment, component 80 proximate each interior passage feature 98 is at least partially formed by second material 362, as will be described herein. A distribution of first material 322 within component 80 is omitted from FIG. 11 for clarity.

In certain embodiments, interior portion 360 of hollow structure 320 is shaped to define the at least one interior passage feature 98. In some such embodiments, inner core 324 is complementarily shaped by interior portion 360 of hollow structure 320 such that inner core 324 defines internal passage 82 including at least one interior passage feature 98 defined therein. For example, inner core 324 is complementarily shaped by interior portion 360 to include at least one complementary feature 331, and the at least one complementary feature 331 has a shape complementary to a shape of at least one interior passage feature 98.

For example, in the illustrated embodiment, the at least one complementary feature 331 is a plurality of recessed features 334 defined in an exterior surface of inner core 324. Each recessed feature 334 has a shape complementary to a shape of a corresponding interior passage feature 98. More specifically, in the illustrated embodiment, interior portion 360 of hollow structure 320 includes protrusions 341 formed as a plurality of stud shapes that extend radially inwardly on interior portion 360 of hollow structure 320, such that when inner core material 326 is added to hollow structure 320, protrusions 341 define recessed features 334. Thus, when molten component material 78 is introduced into mold cavity 304 and hollow structure 320 is at least partially absorbed into molten component material 78, molten component material 78 fills in against the at least one complementary feature 331, and cooled component material 78 within the at least one complementary feature 331 forms the at least one interior passage feature 98. Additionally or alternatively, to an extent that a portion of interior portion 360 of hollow structure 320 adjacent inner core 324 remains intact after molten component material 78 is introduced into mold cavity 304 and cooled, the intact portion of interior portion 360 coupled against the at least one complementary feature 331 defines the at least one interior passage feature 98.

In the exemplary embodiment, interior portion 360 of hollow structure 320 includes at least protrusions 341 formed at least partially from second material 362, and a remainder of hollow structure 320 formed from first material 322. In alternative embodiments, hollow structure 320 includes any suitable distribution of first material 322 and second material 362. In some embodiments, after jacketed core 310 is positioned with respect to mold 300 (shown in FIG. 3) and molten component material 78 is added to mold cavity 304 and cooled to form component 80, a concentration of second material 362 proximate interior passage features 98 is detectably higher than a concentration of second material 362 at other locations within component 80. Moreover, in some such embodiments, second material 362 forms at least a portion of interior passage features 98.

To form hollow structure 320, a computer design model of hollow structure 320 again is sliced into a series of thin, parallel planes between first end 350 and second end 352, such that a distribution of each of first material 322 and second material 362 within each plane is defined. A computer numerically controlled (CNC) machine deposits successive layers of first material 322 and, for layers in which at least one protrusion 341 is partially defined, second material 362 from first end 350 to second end 352 in accordance with the model slices to form hollow structure 320. For example, the additive manufacturing process is again suitably configured for alternating deposition of each of a plurality of metallic and/or metallic and ceramic materials, and the alternating deposition is suitably controlled according to the computer design model to produce the defined distribution of first material 322 and second material 362 in each layer. One such representative layer is indicated as layer 366. In some embodiments, the successive layers each including first material 322 and, for layers in which at least one protrusion 341 is partially defined, second material 362 are deposited using at least one of a direct metal laser melting (DMLM) process, a direct metal laser sintering (DMLS) process, a selective laser sintering (SLS) process, an electron beam melting (EBM) process, a selective laser melting process (SLM), and a robocasting extrusion-type additive process. Additionally or alternatively, the successive layers of first material 322 and second material 362 are deposited using any suitable process that enables hollow structure 320 to be formed as described herein.

In some embodiments, the formation of hollow structure 320 by an additive manufacturing process enables hollow structure 320 to be formed with protrusions 341 formed at least partially from second material 362 that would be difficult and/or relatively more costly to produce by other methods of forming hollow structure 320. Correspondingly, the formation of hollow structure 320 by an additive manufacturing process enables component 80 to be formed with interior passage features 98 formed at least partially from second material 362 that would be difficult and/or relatively more costly to (i) produce by other methods of forming component 80, and/or (ii) add to component 80 in a separate process after initial formation of component 80 in mold 300. For example, in certain embodiments, second material 362 is relatively more resistant to corrosion than first material 322, but also relatively more expensive, such that use of second material 362 is selected for use to facilitate preserving a shape of interior passage features 98 against corrosion and first material 322 and/or component material 78 are sufficient to achieve a specified anti-corrosion design criterion for other portions of interior wall 100, thereby reducing a cost associated with component 80.

Figure 14:
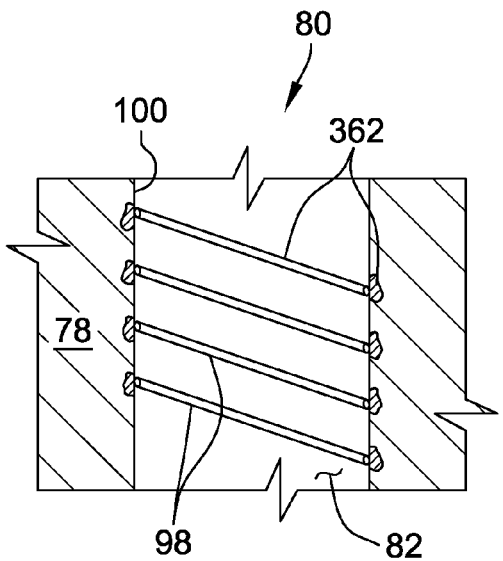
FIG. 14 is a schematic sectional view of a portion of another exemplary component for use with the rotary machine shown in FIG. 1.
Figures 15, 16:
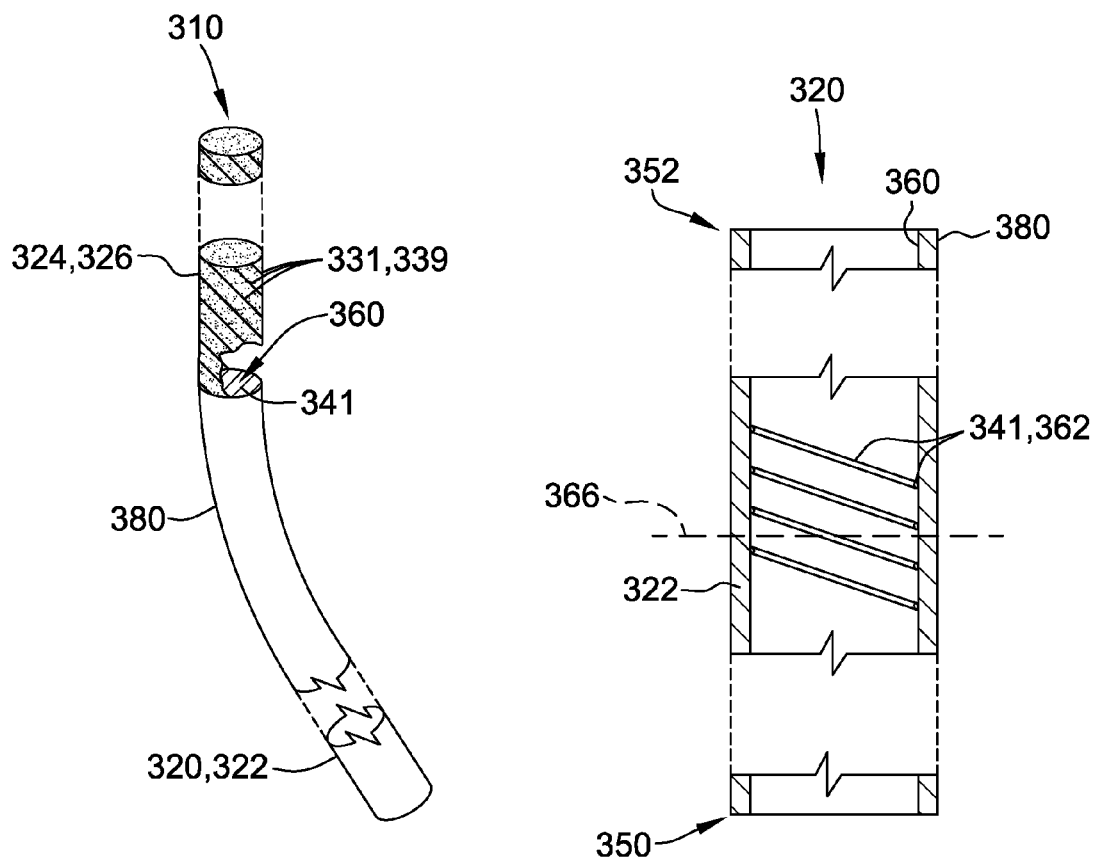
FIG. 15 is a schematic perspective cutaway view of another exemplary jacketed core for use with the mold assembly shown in FIG. 3 to form the component shown in FIG. 14.
FIG. 16 is a schematic sectional view of an exemplary embodiment of a hollow structure for use in forming the jacketed core shown in FIG. 15.

FIG. 14 is a schematic sectional view of a portion of another exemplary component 80 that includes internal passage 82 having a plurality of interior passage features 98. FIG. 15 is a schematic perspective cutaway view of another exemplary jacketed core 310 for use in mold assembly 301 to form component 80 having interior passage features 98 as shown in FIG. 14. In particular, a portion of hollow structure 320 is cut away in the view of FIG. 15 to illustrate features of inner core 324. FIG. 16 is a schematic sectional view of a portion of another hollow structure 320 for use in forming jacketed core 310. Hollow structure 320 again is formed from first material 322 and second material 362.

With reference to FIGS. 14-16, internal passage 82 again is generally defined by interior wall 100 of component 80, and interior passage features 98 again are shaped to define local variations in a flow path defined by internal passage 82. In the exemplary embodiment, component 80 proximate each interior passage feature 98 again is at least partially formed by second material 362, as will be described herein. A distribution of first material 322 within component 80 is omitted from FIG. 14 for clarity.

In certain embodiments, interior portion 360 of hollow structure 320 again is shaped to define the at least one interior passage feature 98. In some such embodiments, inner core 324 again is complementarily shaped by interior portion 360 of hollow structure 320 such that inner core 324 defines internal passage 82 including at least one interior passage feature 98 defined therein. More specifically, in the exemplary embodiment, interior portion 360 of hollow structure 320 is shaped to define the at least one interior passage feature 98 as a rifled groove along interior wall 100 of internal passage 82. Correspondingly, interior portion 360 includes a rifled protrusion 341 shaped to define the at least one complementary feature 331 of inner core 324 as a rifled groove structure 339 when inner core material 326 is added to hollow structure 320. Thus, when molten component material 78 is introduced into mold cavity 304 and hollow structure 320 is at least partially absorbed into molten component material 78, molten component material 78 fills in against the at least one complementary feature 331, and cooled component material 78 within the at least one complementary feature 331 again forms the at least one interior passage feature 98. Additionally or alternatively, to an extent that a portion of interior portion 360 of hollow structure 320 adjacent inner core 324 remains intact after molten component material 78 is introduced into mold cavity 304 and cooled, the intact portion of interior portion 360 coupled against the at least one complementary feature 331 again defines the at least one interior passage feature 98.

In the exemplary embodiment, hollow structure 320 includes at least protrusions 341 formed at least partially from second material 362, and a remainder of hollow structure 320 formed from first material 322. In alternative embodiments, hollow structure 320 includes any suitable distribution of first material 322 and second material 362. In some embodiments, after jacketed core 310 is positioned with respect to mold 300 (shown in FIG. 3) and molten component material 78 is added to mold cavity 304 and cooled to form component 80, a concentration of second material 362 proximate interior passage features 98 is detectably higher than a concentration of second material 362 at other locations within component 80. Moreover, in some such embodiments, second material 362 forms at least a portion of interior passage features 98.

To form hollow structure 320, a computer design model of hollow structure 320 again is sliced into a series of thin, parallel planes between first end 350 and second end 352, such that a distribution of each of first material 322 and second material 362 within each plane is defined. A computer numerically controlled (CNC) machine deposits successive layers of first material 322 and, for layers in which protrusion 341 is partially defined, second material 362 from first end 350 to second end 352 in accordance with the model slices to form hollow structure 320. For example, the additive manufacturing process is again suitably configured for alternating deposition of each of a plurality of metallic and/or metallic and ceramic materials, and the alternating deposition is suitably controlled according to the computer design model to produce the defined distribution of first material 322 and second material 362 in each layer. One such representative layer is indicated as layer 366. In some embodiments, the successive layers each including first material 322 and, for layers in which protrusion 341 is partially defined, second material 362 are deposited using at least one of a direct metal laser melting (DMLM) process, a direct metal laser sintering (DMLS) process, a selective laser sintering (SLS) process, an electron beam melting (EBM) process, a selective laser melting process (SLM), and a robocasting extrusion-type additive process. Additionally or alternatively, the successive layers of first material 322 and second material 362 are deposited using any suitable process that enables hollow structure 320 to be formed as described herein.

In some embodiments, the formation of hollow structure 320 by an additive manufacturing process again enables component 80 to be formed with interior passage features 98 formed at least partially from second material 362 that would be difficult and/or relatively more costly to (i) produce by other methods of forming component 80, and/or (ii) add to component 80 in a separate process after initial formation of component 80 in mold 300, as described above.

With reference to FIGS. 11-16, although interior passage features 98 are illustrated studs and/or rifled grooves, it should be understood that this disclosure contemplates interior passage features 98 having any suitable additional or alternative shape that enables internal passage 82 to function for its intended purpose, and interior portion 360 of hollow structure 320 and complementary features 331 of inner core 324 having any suitable corresponding shape that enables interior passage features 98 to be formed as described herein. Moreover, although the illustrated embodiments show each embodiment of interior passage features 98 as having a substantially identical repeating shape, it should be understood that this disclosure contemplates interior passage features 98 having any suitable combination of different shapes that enables internal passage 82 to function for its intended purpose, and interior portion 360 of hollow structure 320 and complementary features 331 of inner core 324 having any suitable corresponding combination of different shapes that enables interior passage features 98 to be formed as described herein.

Figure 17:
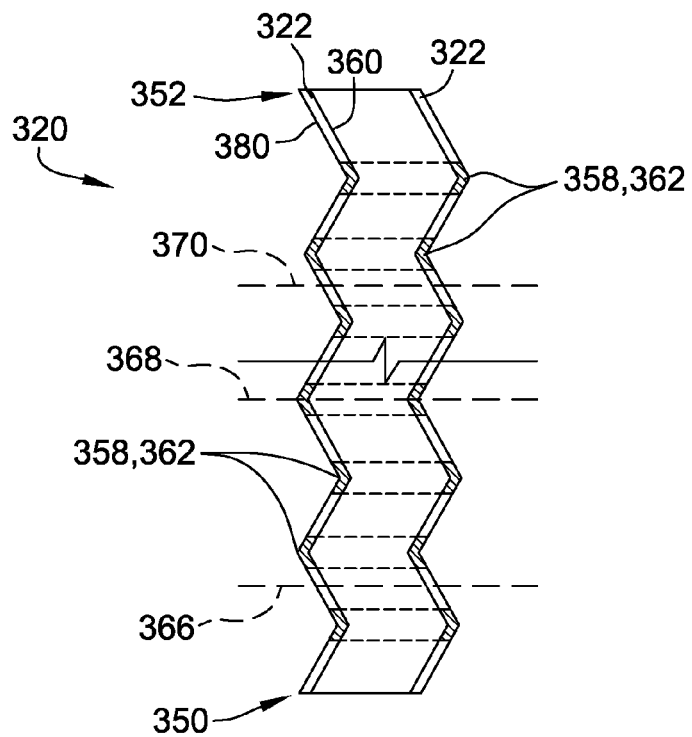
FIG. 17 is a schematic sectional view of a portion of another exemplary component for use with the rotary machine shown in FIG. 1.
Figure 18:
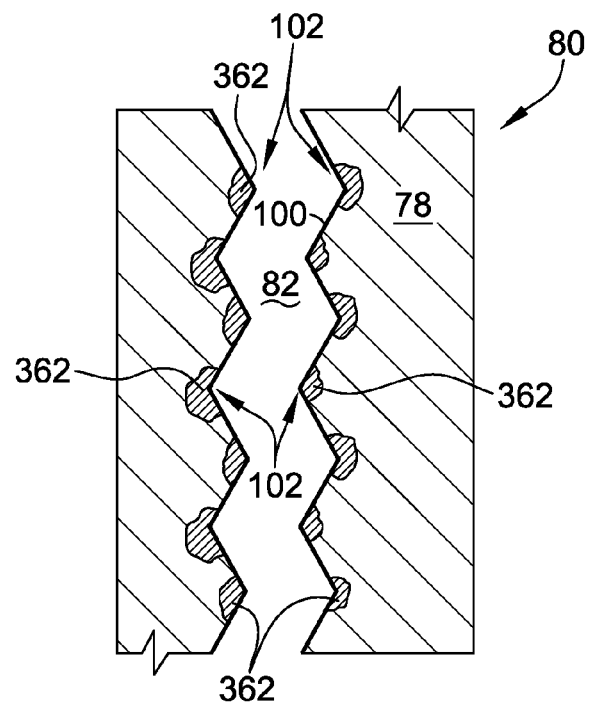
FIG. 18 is a schematic sectional view of an exemplary embodiment of a hollow structure for use in forming a jacketed core for use with the mold assembly shown in FIG. 3 to form the component shown in FIG. 17.

FIG. 17 is a schematic sectional view of a portion of another exemplary component 80 that includes internal passage 82 defined therein. FIG. 18 is a schematic sectional view of a portion of another hollow structure 320 for use in mold assembly 301 to form component 80 shown in FIG. 17. Hollow structure 320 again is formed from first material 322 and second material 362. In the exemplary embodiment, second material 362 is a relatively higher strength material than first material 322. Alternatively, second material 362 is a material capable of joining synergistically with at least one of component material 78 and first material 322 to improve upon a structural strength characteristic of the at least one of component material 78 and first material 322.

With reference to FIGS. 17 and 18, internal passage 82 again is defined by interior wall 100 of component 80. In the exemplary embodiment, a shape of internal passage 82 defines at least one stress concentration region 102 in a component 80 proximate interior wall 100. A concentration of second material 362 proximate the at least one stress concentration region 102 facilitates an increased stress resistance of component 80 in the at least one stress concentration region 102. A distribution of first material 322 within component 80 is omitted from FIG. 17 for clarity.

In certain embodiments, inner core 324 (not shown) again is complementarily shaped by interior portion 360 of hollow structure 320 such that inner core 324 defines internal passage 82 including the at least one stress concentration region 102. At least one portion 358 of hollow structure 320 corresponding to the at least one stress concentration region 102 is at least partially formed from second material 362, and a remainder of hollow structure 320 is formed from first material 322. In alternative embodiments, hollow structure 320 includes any suitable distribution of first material 322 and second material 362. Hollow structure 320 is then filled with inner core material 326 to form jacketed core 310 similar to that shown in FIG. 3. In some embodiments, after jacketed core 310 is positioned with respect to mold 300 (shown in FIG. 3) and molten component material 78 is added to mold cavity 304 and cooled to form component 80, second material 362 forms at least a portion of the at least one stress concentration region 102.

To form hollow structure 320, a computer design model of hollow structure 320 again is sliced into a series of thin, parallel planes between first end 350 and second end 352, such that a distribution of each of first material 322 and second material 362 within each plane is defined. A computer numerically controlled (CNC) machine deposits successive layers of first material 322 and/or second material 362 from first end 350 to second end 352 in accordance with the model slices to form hollow structure 320. For example, the additive manufacturing process is again suitably configured for alternating deposition of each of a plurality of metallic and/or metallic and ceramic materials, and the alternating deposition is suitably controlled according to the computer design model to produce the defined distribution of first material 322 and second material 362 in each layer. Three such representative layers are indicated as layers 366, 368, and 370. In some embodiments, the successive layers each including first material 322 and/or second material 362 are deposited using at least one of a direct metal laser melting (DMLM) process, a direct metal laser sintering (DMLS) process, a selective laser sintering (SLS) process, an electron beam melting (EBM) process, a selective laser melting process (SLM), and a robocasting extrusion-type additive process. Additionally or alternatively, the successive layers of first material 322 and second material 362 are deposited using any suitable process that enables hollow structure 320 to be formed as described herein.

In some embodiments, the formation of hollow structure 320 by an additive manufacturing process again enables hollow structure 320 to be formed with a distribution of second material 362 that would be difficult and/or relatively more costly to produce by other methods of forming hollow structure 320. Correspondingly, the formation of hollow structure 320 by an additive manufacturing process enables component 80 to be formed with an integral distribution of second material 362 proximate the at least one stress concentration region 102 that would be difficult and/or relatively more costly to (i) produce by other methods of forming component 80, and/or (ii) add to component 80 in a separate process after initial formation of component 80 in mold 300.

With further reference to FIGS. 7-18, although the illustrated embodiments show internal passage 82 as having a generally circular cross-section, it should be understood that internal passage 82 has any suitable additional or alternative cross-section that enables internal passage 82 to function for its intended purpose. Moreover, although the illustrated embodiments show each embodiment of internal passage 82 as having a generally constant cross-section along its length, it should be understood that internal passage 82 has any suitable variation in cross-section along its length that enables internal passage 82 to function for its intended purpose. Further, it should be understood that hollow structure 320 is shaped to define any suitable corresponding shape of internal passage 82 in any suitable fashion that enables hollow structure 320 to be formed as described herein.

Figure 19:
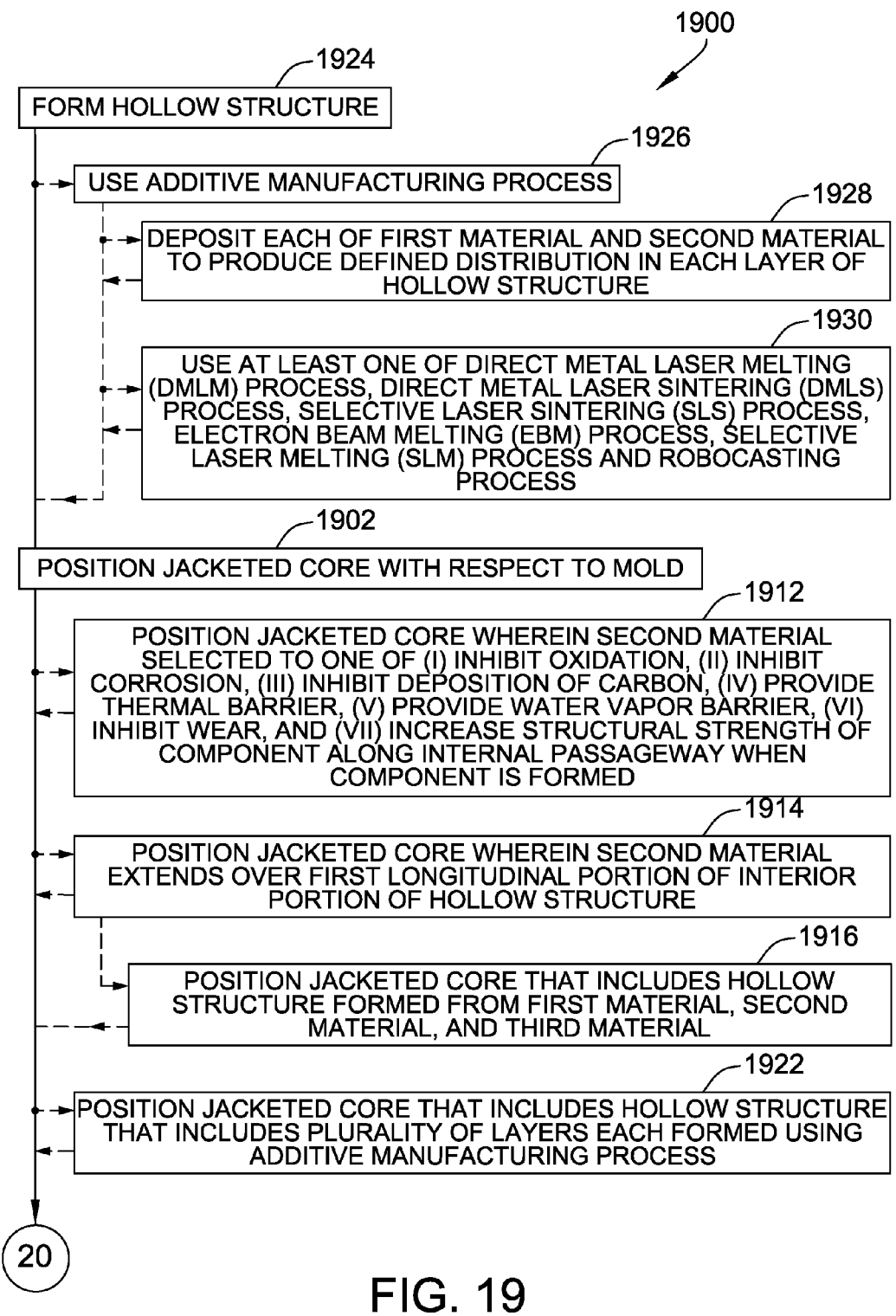
FIG. 19 is a flow diagram of an exemplary method of forming a component having an internal passage defined therein, such as a component for use with the rotary machine shown in FIG. 1.
Figure 20:
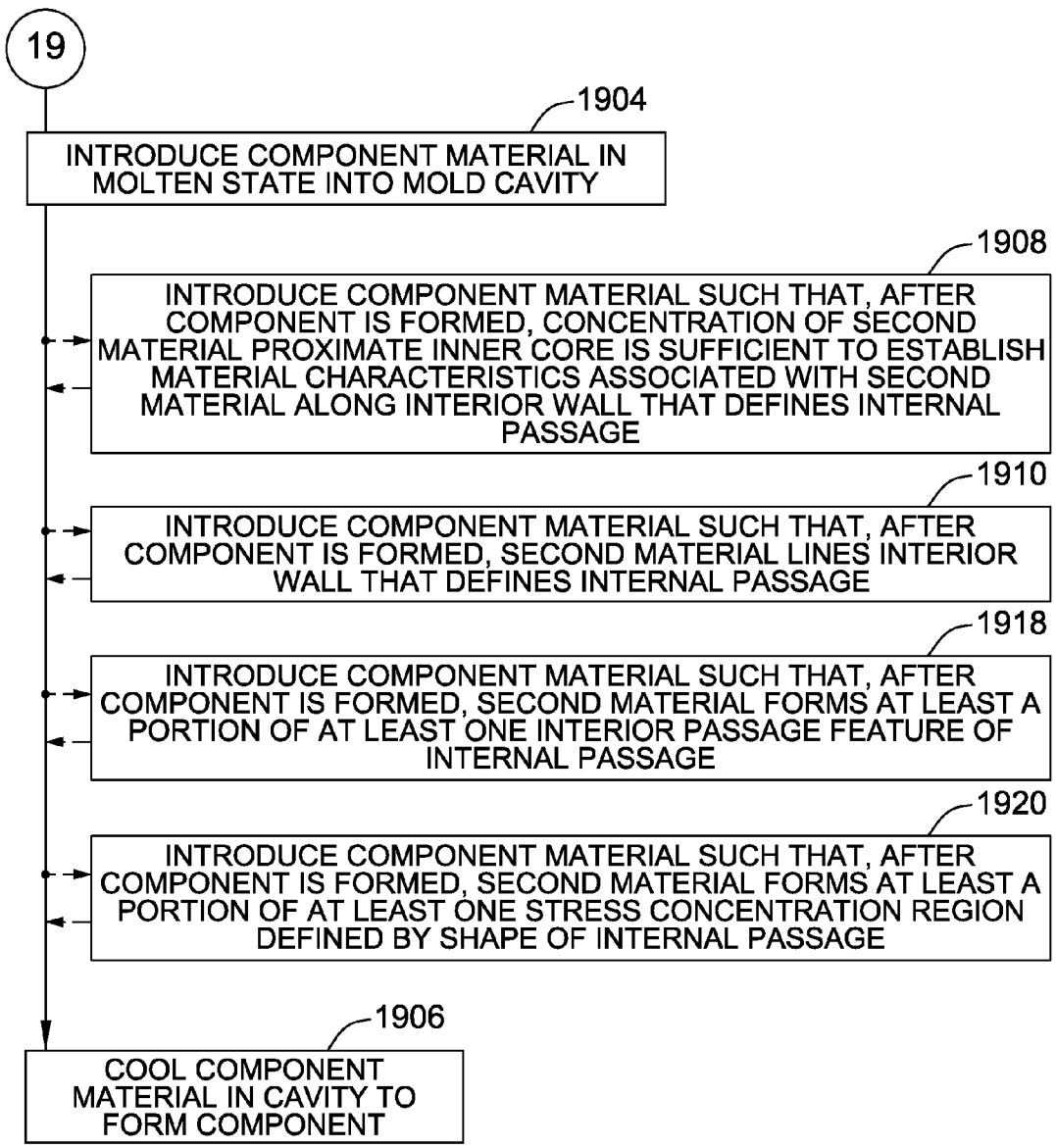
FIG. 20 is a continuation of the flow diagram from FIG. 19.

An exemplary method 1900 of forming a component, such as component 80, having an internal passage defined therein, such as internal passage 82, is illustrated in a flow diagram in FIGS. 19 and 20. With reference also to FIGS. 1-18, exemplary method 1900 includes positioning 1902 a jacketed core, such as jacketed core 310, with respect to a mold, such as mold 300. The jacketed core includes a hollow structure, such as hollow structure 320, formed from at least a first material, such as first material 322, and a second material, such as second material 362. The jacketed core also includes an inner core, such as inner core 324, disposed within the hollow structure. Method 1900 also includes introducing 1904 a component material, such as component material 78, in a molten state into a cavity of the mold, such as mold cavity 304, to form the component, and cooling 1906 the component material in the cavity to form the component. The inner core defines the internal passage within the component.

In some embodiments, the step of introducing 1904 the component material into the cavity includes introducing 1908 the component material such that, after the component is formed, a concentration of the second material proximate the inner core is sufficient to establish at least one material characteristic associated with the second material along at least a portion of an interior wall, such as interior wall 100, that defines the internal passage within the component.

In certain embodiments, the step of introducing 1904 the component material into the cavity includes introducing 1910 the component material such that, after the component is formed, the second material lines at least a portion of an interior wall, such as interior wall 100, that defines the internal passage within the component.

In some embodiments, the step of positioning 1902 the jacketed core includes positioning 1912 the jacketed core wherein the second material is selected from at least one of (i) an oxidation-inhibiting material, (ii) a corrosion-inhibiting material, (iii) a carbon-deposition-inhibiting material, (iv) a thermal barrier material, (v) a water vapor barrier material, and (vi) a wear-inhibiting material, and (vii) a material that increases a structural strength of the component along the internal passageway when the component is formed.

In certain embodiments, the step of positioning 1902 the jacketed core includes positioning 1914 the jacketed core wherein the second material extends over at least one predefined first longitudinal portion, such as first longitudinal portion 354, of an interior portion of the hollow structure, such as interior portion 360, radially inward of the first material. In some such embodiments, the step of positioning 1914 the jacketed core includes positioning 1916 the jacketed core that includes the hollow structure formed from the first material, the second material, and a third material, such as third material 372. The third material extends over at least one predefined second longitudinal portion of the interior portion of the hollow structure, such as second longitudinal portion 356, radially inward of the first material.

In certain embodiments, an interior portion of the hollow structure, such as interior portion 360, is at least partially formed from the second material, the interior portion is shaped to define at least one interior passage feature of the internal passage, such as interior passage feature 98, and the step of introducing 1904 the component material into the cavity includes introducing 1918 the component material such that, after the component is formed, the second material forms at least a portion of the at least one interior passage feature.

In some embodiments, a shape of the internal passage defines at least one stress concentration region in the component, such as stress concentration region 102. Additionally, at least one portion of the hollow structure, such as portion 358, corresponding to the at least one stress concentration region is at least partially formed from the second material. The step of introducing 1904 the component material into the cavity includes introducing 1920 the component material such that, after the component is formed, the second material forms at least a portion of the at least one stress concentration region.

In certain embodiments, the step of positioning 1902 the jacketed core includes positioning 1922 the jacketed core that includes the hollow structure that includes a plurality of layers, such as representative layers 366, 368, and 370, each formed using an additive manufacturing process.

In some embodiments, method 1900 further includes forming 1924 the hollow structure using 1926 an additive manufacturing process. Moreover, in some such embodiments, the step of using 1926 an additive manufacturing process includes alternately depositing 1928 each of the first material and the second material to produce a defined distribution of the first material and the second material in each of a plurality of layers of the hollow structure, such as representative layers 366, 368, and 370. Additionally or alternatively, in some such embodiments, the step of using 1926 an additive manufacturing process includes using 1930 at least one of a direct metal laser melting (DMLM) process, a direct metal laser sintering (DMLS) process, a selective laser sintering (SLS) process, an electron beam melting (EBM) process, a selective laser melting process (SLM), and a robocasting extrusion-type additive process.

The above-described jacketed core provides a cost-effective method for forming components that include internal passages defined therein with materials other than the component material selectively positioned along the internal passage. Specifically, the jacketed core includes the inner core, which is positioned within the mold cavity to define the position of the internal passage within the component, and also includes the hollow structure, within which the inner core is disposed, formed from at least a first material and a second material. The second material is strategically distributed within the hollow structure, such as by an additive manufacturing process, such that the second material is selectively positioned along the internal passage when the component is formed in the mold. For example, but not by way of limitation, the second material is selectively positioned to provide an anti-corrosion coating for turbulators disposed along the internal passage, or to structurally reinforce a stress concentration associated with a shape of the internal passage. As just one illustration, a relatively lower strength component material meets strength requirements for most portions of the component and is selected to provide a better overall thermal performance for the component, and the selective addition of the second material near the internal passage enables greater localized strength as needed in an area where thermal performance is relatively less critical.

Also, specifically, the first material and the second material are each at least partially absorbable by the molten component material introduced into the mold cavity to form the component. Thus, the use of the hollow structure does not interfere with the structural or performance characteristics of the component, and does not interfere with the later removal of the inner core material from the component to form the internal passage.

An exemplary technical effect of the methods, systems, and apparatus described herein includes at least one of: (a) reducing or eliminating fragility problems associated with forming, handling, transport, and/or storage of the core used in forming a component having an internal passage defined therein; and (b) an ability to reliably and repeatably selectively position a second material along the internal passage when the component is formed in the mold, even for internal passages having nonlinear and/or complex shapes and/or characterized by high L/d ratios.

Exemplary embodiments of jacketed cores are described above in detail. The jacketed cores, and methods and systems using such jacketed cores, are not limited to the specific embodiments described herein, but rather, components of systems and/or steps of the methods may be utilized independently and separately from other components and/or steps described herein. For example, the exemplary embodiments can be implemented and utilized in connection with many other applications that are currently configured to use cores within mold assemblies.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of forming a component having an internal passage defined therein, said method comprising:
    positioning a jacketed core with respect to a mold, wherein the jacketed core includes:
        a hollow structure consisting of a plurality of metallic materials including at least a first material and a second material; and
        an inner core disposed within the hollow structure;
    introducing a component material in a molten state into a cavity of the mold; and
    cooling the component material in the cavity to form the component, wherein the inner core defines the internal passage within the component.

2. The method of claim 1, wherein said introducing the component material into the cavity comprises introducing the component material such that, after the component is formed, a concentration of the second material proximate the inner core is sufficient to establish at least one material characteristic associated with the second material along at least a portion of an interior wall that defines the internal passage within the component.

3. The method of claim 1, wherein said introducing the component material into the cavity comprises introducing the component material such that, after the component is formed, the second material lines at least a portion of an interior wall that defines the internal passage within the component.

4. The method of claim 1, wherein said positioning the jacketed core comprises positioning the jacketed core wherein the second material is selected from at least one of (i) an oxidation-inhibiting material, (ii) a corrosion-inhibiting material, (iii) a carbon-deposition-inhibiting material, (iv) a thermal barrier material, (v) a water vapor barrier material, and (vi) a wear-inhibiting material, and (vii) a material that increases a structural strength of the component along the internal passageway when the component is formed.

5. The method of claim 1, wherein said positioning the jacketed core comprises positioning the jacketed core wherein the second material extends over at least one predefined first longitudinal portion of an interior portion of the hollow structure, radially inward of the first material.

6. The method of claim 5, wherein said positioning the jacketed core comprises positioning the jacketed core that includes the hollow structure formed from the first material, the second material, and a third material, and wherein the third material extends over at least one predefined second longitudinal portion of the interior portion of the hollow structure, radially inward of the first material.

7. The method of claim 1, wherein an interior portion of the hollow structure is at least partially formed from the second material, the interior portion shaped to define at least one interior passage feature of the internal passage, said introducing the component material into the cavity comprises introducing the component material such that, after the component is formed, the second material forms at least a portion of the at least one interior passage feature.

8. The method of claim 1, wherein a shape of the internal passage defines at least one stress concentration region in the component, and wherein at least one portion of the hollow structure corresponding to the at least one stress concentration region is at least partially formed from the second material, said introducing the component material into the cavity comprises introducing the component material such that, after the component is formed, the second material forms at least a portion of the at least one stress concentration region.

9. The method of claim 1, wherein said positioning the jacketed core comprises positioning the jacketed core that includes the hollow structure that includes a plurality of layers each formed using an additive manufacturing process.

10. The method of claim 1, further comprising forming the hollow structure using an additive manufacturing process.

11. The method of claim 10, wherein using an additive manufacturing process comprises alternately depositing each of the first material and the second material to produce a defined distribution of the first material and the second material in each of a plurality of layers of the hollow structure.

12. The method of claim 10, wherein using an additive manufacturing process comprises using at least one of a direct metal laser melting (DMLM) process, a direct metal laser sintering (DMLS) process, a selective laser sintering (SLS) process, an electron beam melting (EBM) process, a selective laser melting process (SLM), and a robocasting extrusion-type additive process.

13. A mold assembly for use in forming a component having an internal passage defined therein, said mold assembly comprising:
    a mold defining a mold cavity therein; and
    a jacketed core positioned with respect to said mold, said jacketed core comprising:
        a hollow structure consisting of a plurality of metallic materials including at least a first material and a second material; and
        an inner core disposed within said hollow structure, wherein said inner core is positioned to define the internal passage within the component when a component material in a molten state is introduced into said mold cavity and cooled to form the component.

14. The mold assembly of claim 13, wherein said second material is selected from at least one of (i) an oxidation inhibiting material, (ii) a corrosion-inhibiting material, (iii) a carbon-deposition-inhibiting material, (iv) a thermal barrier material, (v) a water vapor barrier material, and (vi) a wear-inhibiting material, and (vii) a material that increases a structural strength of the component along the internal passageway when the component is formed.

15. The mold assembly of claim 13, wherein said second material extends over at least one predefined first longitudinal portion of an interior portion of said hollow structure, radially inward of said first material.

16. The mold assembly of claim 13, wherein said hollow structure is formed from said first material, said second material, and a third material, said third material extends over at least one predefined second longitudinal portion of said interior portion of said hollow structure, radially inward of said first material.

17. The mold assembly of claim 13, wherein said hollow structure comprises an interior portion at least partially formed from said second material, said interior portion shaped to define at least one interior passage feature of the internal passage when the component is formed.

18. The mold assembly of claim 13, wherein a shape of the internal passage defines at least one stress concentration region in the component, and wherein at least one portion of said hollow structure corresponding to the at least one stress concentration region is at least partially formed from said second material.

19. The mold assembly of claim 13, wherein said second material is at least one of:

a relatively higher strength material than said first material, and capable of joining synergistically with at least one of the component material and said first material such that a structural strength characteristic of said at least one of the component material and said first material is improved.

20. The mold assembly of claim 13, wherein said hollow structure comprises a plurality of layers each formed using an additive manufacturing process.

21. A mold assembly for use in forming a component having an internal passage defined therein, said mold assembly comprising:
a mold defining a mold cavity therein; and
a jacketed core positioned with respect to said mold, said jacketed core comprising:
a hollow structure comprising an outer wall, an interior portion radially inward of said outer wall, and a plurality of protrusions that extend radially inwardly from said interior portion, wherein said outer wall is formed from a first material that is metallic, and wherein said plurality of protrusions is formed at least partially from a second material; and
an inner core disposed within said hollow structure, wherein said inner core comprises complementary features that receive said plurality of protrusions and is positioned to define the internal passage within the component when a component material in a molten state is introduced into said mold cavity and cooled to form the component.

\* \* \* \* \*